US009313721B2

(12) United States Patent
Abe et al.

(10) Patent No.: US 9,313,721 B2
(45) Date of Patent: Apr. 12, 2016

(54) INFORMATION PROVIDING APPARATUS AND INFORMATION PROVIDING METHOD, WIRELESS COMMUNICATION APPARATUS AND WIRELESS COMMUNICATION METHOD, COMPUTER PROGRAM, AND WIRELESS COMMUNICATION SYSTEM

(75) Inventors: Shinichiro Abe, Tokyo (JP); Shigeru Arisawa, Tokyo (JP); Takashi Usui, Tokyo (JP); Seiji Esaka, Tokyo (JP); Shuhei Sonoda, Kanagawa (JP); Masayuki Takada, Tokyo (JP); Hiroyuki Yamasuge, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/394,404

(22) PCT Filed: Aug. 4, 2010

(86) PCT No.: PCT/JP2010/063165
§ 371 (c)(1),
(2), (4) Date: Apr. 16, 2012

(87) PCT Pub. No.: WO2011/030636
PCT Pub. Date: Mar. 17, 2011

(65) Prior Publication Data
US 2012/0190339 A1 Jul. 26, 2012

(30) Foreign Application Priority Data

Sep. 14, 2009 (JP) ................................ P2009-212082

(51) Int. Cl.
*H04W 4/02* (2009.01)
*H04W 12/02* (2009.01)
(Continued)

(52) U.S. Cl.
CPC .......... *H04W 48/16* (2013.01); *H04W 52/0258* (2013.01); *H04W 64/00* (2013.01); *Y02B 60/50* (2013.01)

(58) Field of Classification Search
CPC ..... H04W 4/02; H04W 76/028; H04W 48/04; H04W 64/00; H04W 64/006; H04W 24/02; H04W 36/32; H04W 52/283
USPC ..................... 455/404.1, 404.2, 414.1–414.3, 455/456.1–456.4, 456.6; 340/988–995.28; 701/400–541
See application file for complete search history.

(56) References Cited

U.S. PATENT DOCUMENTS 6,597,906 B1 * 7/2003 Van Leeuwen et al. ... 455/422.1
6,944,533 B2 * 9/2005 Kozak et al. .................. 701/540
(Continued)

FOREIGN PATENT DOCUMENTS

CN 1256851 A 6/2000
CN 1256851 C 5/2006
(Continued)

*Primary Examiner* — Vladimir Magloire
*Assistant Examiner* — Erica Navar
(74) *Attorney, Agent, or Firm* — Wolf, Greenfield & Sacks, P.C.

(57) ABSTRACT

To reduce power consumption for communication operation wherein a client terminal at the time of offline searches a base station or access point.
A server uses a communication information predicting algorithm to predict a location or time whereby the server becomes an offline state over a movement route of a client terminal, and a location or time whereby the server returns to an online state, and informs to the client terminal. The client terminal suspends a communication function when reaching the informed offline predicted location or time. The client terminal at the time of offline determines that the current location or time has reached an online return predicted location or time using location recognition or point-in-time recognition, and restores the communication function.

16 Claims, 15 Drawing Sheets

(51) Int. Cl.
*H04W 48/16* (2009.01)
*H04W 52/02* (2009.01)
*H04W 64/00* (2009.01)

(56) References Cited

U.S. PATENT DOCUMENTS

| | | | |
|---|---|---|---|
| 2005/0125148 A1* | 6/2005 | Van Buer et al. | 701/209 |
| 2006/0156209 A1* | 7/2006 | Matsuura et al. | 714/798 |
| 2006/0242267 A1* | 10/2006 | Grossman | 709/218 |
| 2009/0201149 A1* | 8/2009 | Kaji | 340/539.13 |
| 2011/0207509 A1* | 8/2011 | Crawford | 455/574 |

FOREIGN PATENT DOCUMENTS

| | | |
|---|---|---|
| JP | 11-122658 A | 4/1999 |
| JP | 2002-158673 A | 5/2002 |
| JP | 2002-274381 A | 9/2002 |
| JP | 2003-076497 A | 3/2003 |
| JP | 2003-309791 A | 10/2003 |
| JP | 2004-140526 A | 5/2004 |
| JP | 2004-343431 A | 12/2004 |
| JP | 2007-271305 A | 10/2007 |
| JP | 2009-159336 A | 7/2009 |
| WO | WO 2009/001659 A1 | 12/2008 |

* cited by examiner

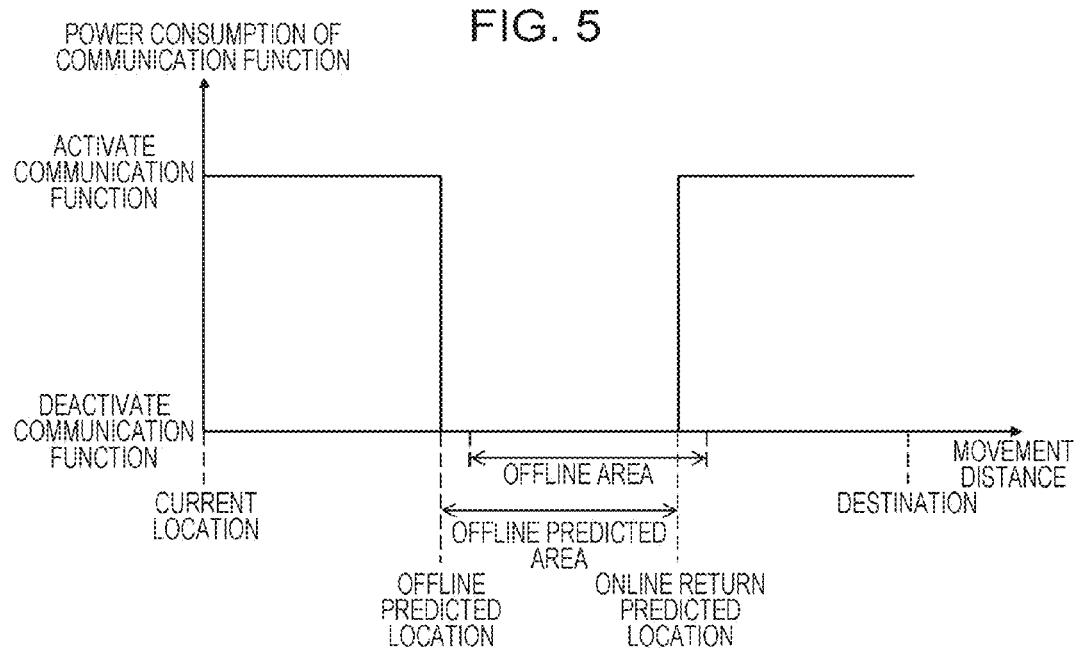
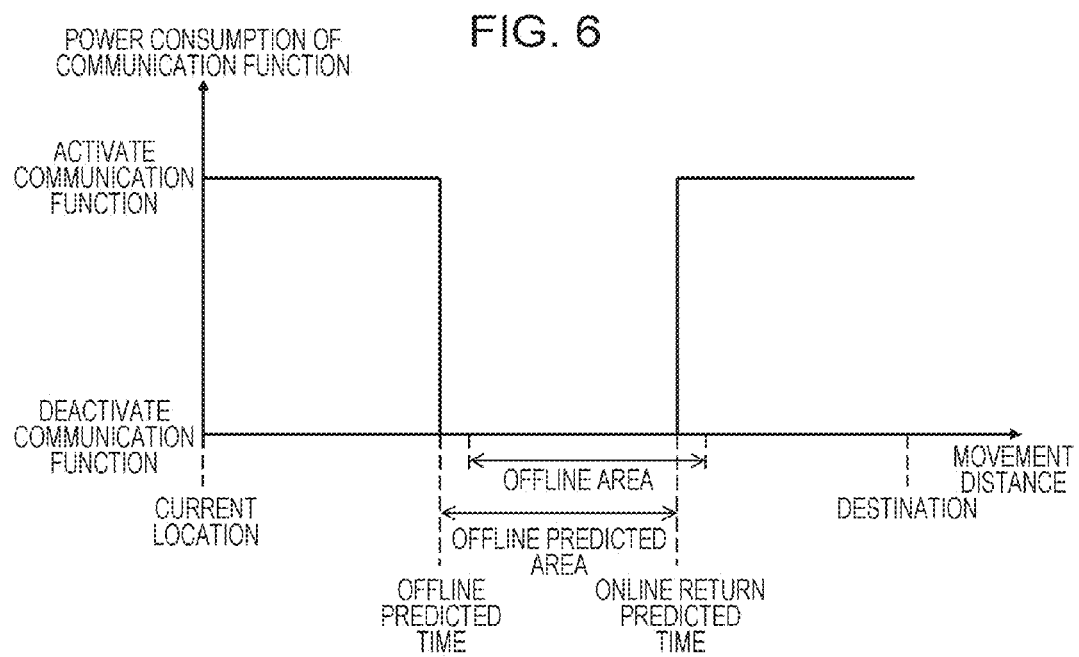

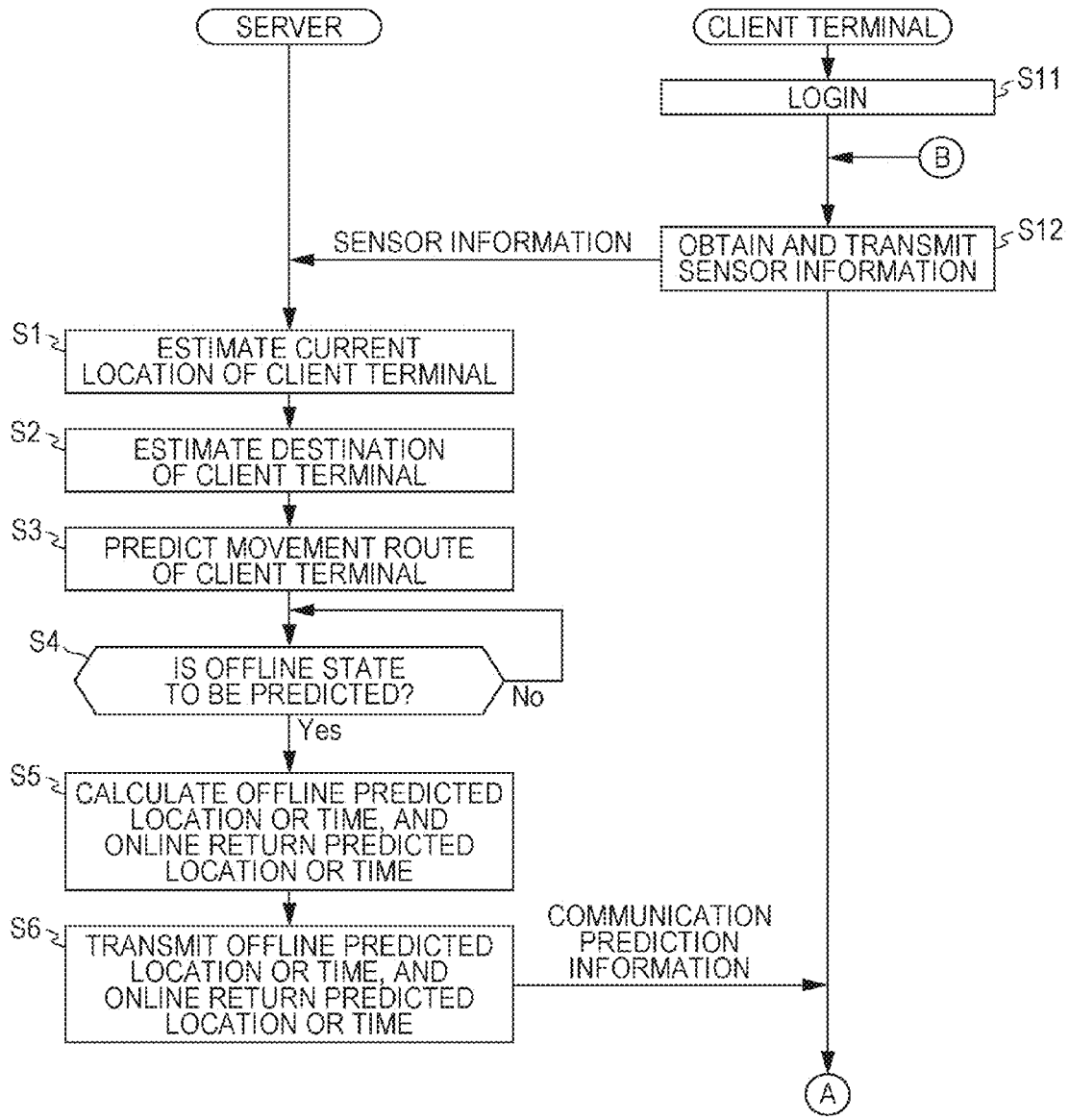

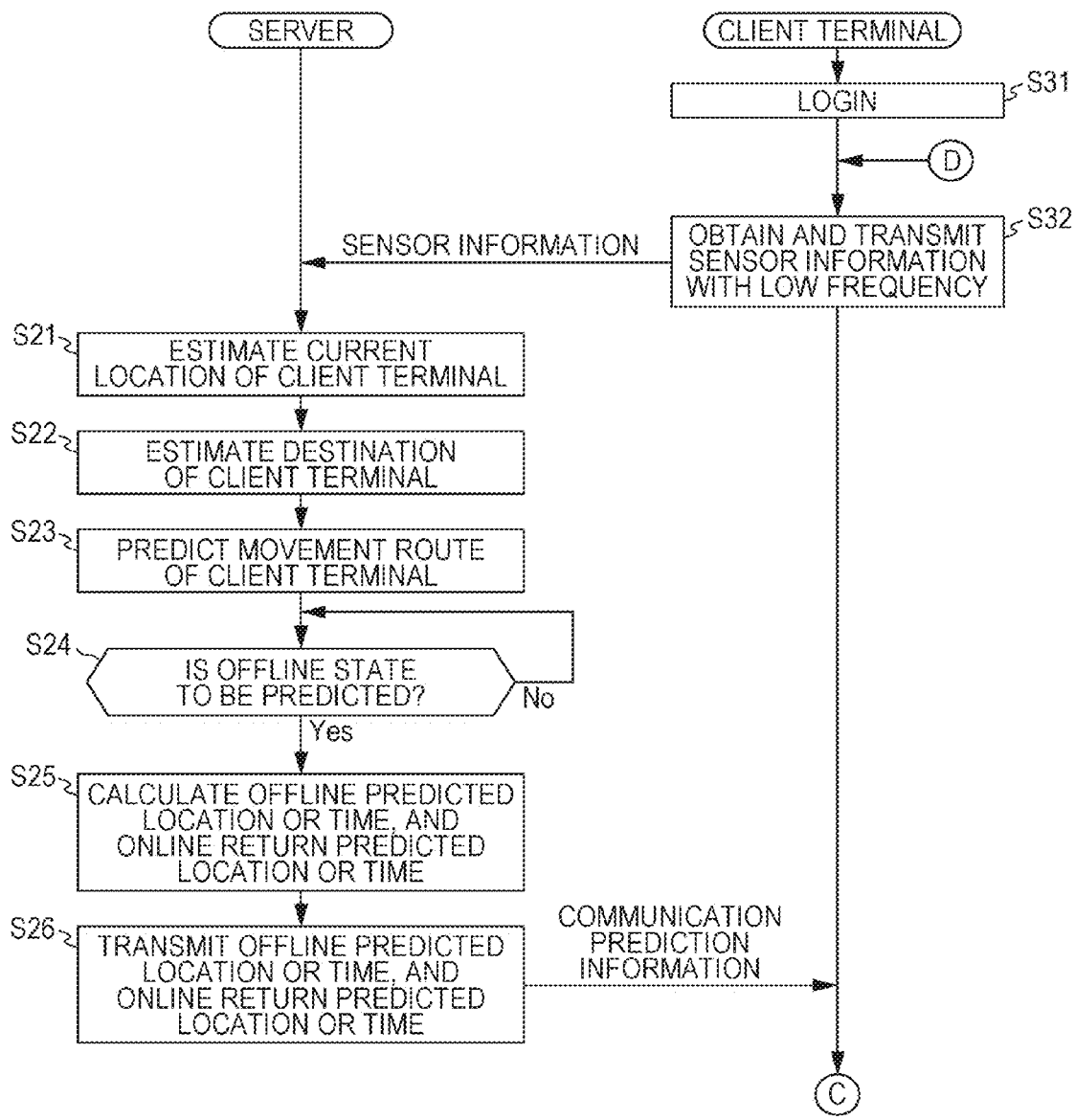

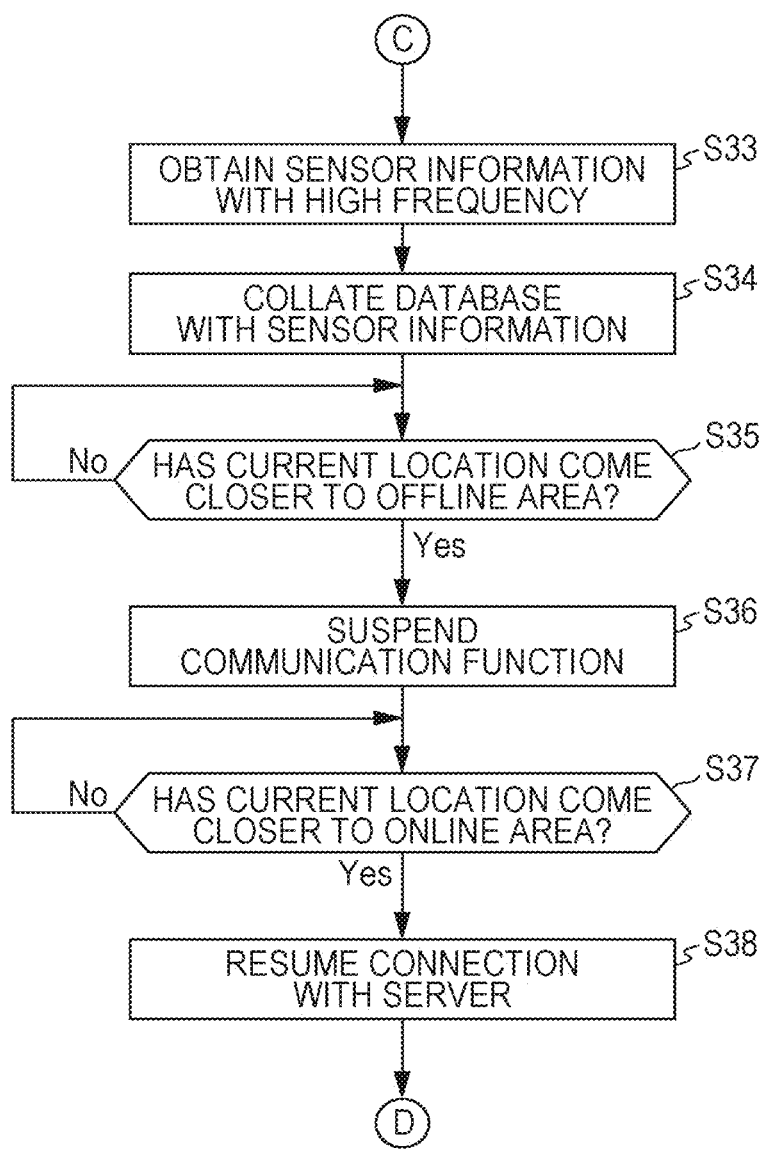

INFORMATION PROVIDING APPARATUS AND INFORMATION PROVIDING METHOD, WIRELESS COMMUNICATION APPARATUS AND WIRELESS COMMUNICATION METHOD, COMPUTER PROGRAM, AND WIRELESS COMMUNICATION SYSTEM

TECHNICAL FIELD

The present invention relates to an information providing apparatus and information providing method for providing information for performing transfer of information and synchronous processing with a server to be connected to a network via a base station or access point to a client terminal, and a wireless communication apparatus and wireless communication method, a computer program, and a wireless communication system for performing transfer of information, and synchronous processing with a server by connecting to a network via a base station or access point, and more particularly relates to an information providing apparatus and information providing method for providing information for performing transfer of information and synchronous processing with a server to a client terminal while reducing power consumption in an offline state where the server is not connected to a base station or access point, and a wireless communication apparatus and wireless communication method, a computer program, and a wireless communication system for performing transfer of information, and synchronous processing with a server while reducing power consumption in an offline state where the server is not connected to a base station or access point.

BACKGROUND ART

Wireless communication has been used as a technique for eliminating load of wiring work in conventional cable communication, and further realizing mobile communications. For example, a wireless LAN (Local Area Network) employing a typical standard such as IEEE (The Institute of Electrical and Electronics Engineers) 802.11 or the like has already come into widespread use. Further, recently, a broadband Internet connection service employing a wireless LAN, of which a "hot spot (registered trademark)" is representative, is coming into common use. Specifically, a base station or access point is installed in a café, hotel, fast-food shop, train station, airport, or the like, and a service area where the Internet is available is provided. A user can receive a service such as IP (Internet Protocol) phone or access to WWW (World Wide Web) information space, or the like even when away from the home or office. Therefore, many information devices serving as a client terminal have often been equipped with a wireless LAN function.

With a wireless communication system made up of a server and client terminals, transfer of information or synchronous processing is mutually performed. Now, many of the client terminals are battery-driven mobile terminals such as cellular phones or PDAs (Personal Digital Assistants) or the like, and accordingly, it is desirable to realize energy saving by shutting down transmitters/receivers when unnecessary.

In the case of a cellular phone, when being in and out of service such as when in a subway, inactivating the communication function when out of service improves the effects of power saving. Known examples include a function for manually turning just the function of a communication system to an off mode, and a function for prolonging the sensing interval as to a base station on a step-by-step basis. However, it is burdensome work for a user to manually perform switching of the operation mode each time the cellular phone experiences being in and out of service, which is poor in practicality.

Also, with a wireless LAN, scan operation for confirming a network existing in the current location is needed. There are two types of scan procedures; active scan and passive scan. With active scan, a client terminal periodically transmits a probe request frame to sense an access point. On the other hand, with passive scan, a client terminal repeats an awake mode for activating a reception state only at the time of reception of a beacon frame from the access point, and a sleep mode for inactivating a reception state without performing transmission by itself. According to passive scan, the transmitter/receiver is suspended under the sleep mode, and accordingly, battery consumption can be suppressed. Also, with a power saving mode at the time of passive scan, the number of times of awake is reduced by thinning out reception of a beacon, whereby power consumption can further be reduced. However, even if operation time is shortened, the reception circuit has to periodically operate for reception of a beacon, and accordingly, the operation of the transmitter/receiver is not completely suspended. Also, a user performs switching of the operation mode of the wireless LAN function manually or using a timer or the like, which is poor in practicality in the same way as described above.

Also, with wireless communication, a situation can be prevented such as loss of synchronous data, partial synchronous processing of data, or the like, by determining whether or not to perform synchronous processing using the value of received field strength (e.g., see PTL 1). However, with synchronous processing determination using received field strength, the received field strength has to be obtained in preparation for the synchronous processing, and the communication function has to constantly operate even in an offline state, and consequently, power consumption increases.

Also, there has been proposed an information distribution system for detecting whether or not wireless communication between an external device and a recording apparatus can be performed according to the signal quality of wireless communication (e.g., see PTL 2). However, in order to sense the signal quality, the communication function needs to constantly operate even in an offline state in the same way as described above, and consequently, power consumption increases.

Also, there has been proposed a network system for performing scheduling of synchronous processing using a method such that synchronous timing is periodically provided using a timer of an information terminal, synchronous processing is started when the processing load of the information terminal reaches equal to or smaller than a stipulated value (so as not to prevent the operation of an application that runs in parallel), or the information terminal monitors the communication load of the network, and when the communication load reaches equal to or smaller than a stipulated value, synchronous processing is started, or synchronous processing is started by a user using a synchronous start operation (e.g., see PTL 3). However, the communication function of the terminal needs to operate for the information terminal monitoring the communication load of the network, and consequently, power consumption increases.

CITATION LIST

Patent Literature

PTL 1: Japanese Unexamined Patent Application Publication No. 2003-309791

PTL 2: Japanese Unexamined Patent Application Publication No. 2003-76497

PTL 3: Japanese Unexamined Patent Application Publication No. 2002-158673

DISCLOSURE OF INVENTION

Technical Problem

It is an object of the present invention to provide an excellent information providing apparatus and information providing method, computer program, and wireless communication system, whereby information for performing transfer of information and synchronous processing with a server to be connected to a network via a base station or access point can suitably be provided to a client terminal.

It is further another object of the present invention to provide an excellent information providing apparatus and information providing method, computer program, and wireless communication system, whereby information for performing transfer of information and synchronous processing with a server can suitably be provided to a client terminal while reducing power consumption in an offline state where the server is not connected to a base station or access point.

Also, it is another object of the present invention to provide an excellent wireless communication apparatus and wireless communication method, and computer program, whereby transfer of information and synchronous processing with a server can suitably be performed by connecting to a network via a base station or access point.

It is further another object of the present invention to provide an excellent wireless communication apparatus and wireless communication method, and computer program, whereby transfer of information and synchronous processing with a server can suitably be performed while reducing power consumption in an offline state where the server is not connected to a base station or access point.

Solution to Problem

The present application has been made in light of the above problem, and an invention according to claim 1 is an information providing apparatus configured to operate as a server in a wireless communication system where the server and a client terminal mutually transfer information and are mutually synchronized by wireless communication, and is an information providing apparatus comprising: a communication unit configured to connect to a client terminal to perform communication; a contents analyzing unit configured to estimate the destination of a user who possess a client terminal; a movement predicting unit configured to estimate the current location of the client terminal, and also to predict a movement route from the current location to the destination; and a communication predicting unit configured to predict the communication quality of the client terminal over the predicted movement route to inform to the client terminal.

With an invention according to claim 2 of the present application, an information providing apparatus according to claim 1 further includes a private content database configured to hold a user's private content. The contents analyzing unit is configured to analyze the contents of a user's private content held in the private content database, and to estimate the user's destination based on an obtained action schedule.

The private contents mentioned here are, with an invention according to claim 1 of the present application, a schedule, an E-mail, and a memo pad created or edited by a user.

Also, with an invention according to claim 3 of the present application, a private content includes a user's action history. The examples of the action history includes, with an invention according to claim 3 of the present application, a user's login ID, login time and date, login location, logoff time and date, logoff location, transportation system history, purchase history of various products, viewing history of broadcast programs and other contents, and operation history of various types of information equipment.

With an invention according to claim 4 of the present application, the movement predicting unit of the information providing apparatus according to claim 1 is configured to estimate the current location based on sensor information obtained from the client terminal.

The sensor information mentioned here is, with an invention according to claim 5 of the present application, sensor information that can be used at the time of estimating the location information of a client terminal, such as GPS (Global Positioning System) reception radio wave information, received signal strength information of a WiFi base station (RSSI: Receiving Signal Strength Indicator), acceleration information measured by an acceleration sensor, or the like, which is measured by the client terminal.

With an invention according to claim 6 of the present application, the movement predicting unit of the information providing apparatus according to claim 1 is configured to predict a movement route from the estimated current location to a destination using a learning algorithm employing a hidden Markov model.

With an invention according to claim 7 of the present application, the information providing apparatus according to claim 1 further includes a communication information database configured to hold the communication information of a base station or access point at each spot. The communication predicting unit is also configured to predict a connection state between the client terminal and a base station or access point over the movement route based on the communication information database.

Examples of the communication information mentioned here include, with an invention according to claim 8 of the present application, the transmission rate or received radio wave strength of a base station or access point at each spot.

With an invention according to claim 1 of the present application, the communication predicting unit of the information providing apparatus according to claim 1 is configured to transmit, when predicting that there is an offline area where the client terminal has an inability to connect to any base station or access point over the movement route, communication prediction information including the connection disabled state of the client terminal, and a connectable condition with a base station or access point of the client terminal beforehand.

The communication prediction information mentioned here includes, with an invention according to claim 9 of the present application, as information of the connection disabled state, an offline predicted location or offline predicted time with the client terminal arriving at the offline area, and includes, as information of the connectable condition, an online return predicted location or online return predicted time with the client terminal returning to an online area.

With an invention according to claim 1 of the present application, the communication unit of the information providing apparatus according to claim 1 is configured to suspend connection with a client terminal of which the connection disabled state has been predicted by the communication predicting unit until the connectable condition is satisfied.

With an invention according to claim 1 of the present application, the communication unit of the information providing apparatus according to claim 1 is configured to release pause of connection with a client terminal to attempt connection therewith when another predetermined condition is satisfied even in the event that the connectable condition is not satisfied.

Also, an invention according to claim 10 of the present application is an information providing method including: a contents analyzing step arranged to estimate the destination of a user who possess a client terminal; a movement predicting step arranged to estimate the current location of the client terminal, and also to predict a movement route from the current location to the destination; and a communication predicting step arranged to predict the communication quality of the client terminal over the predicted movement route to inform to the client terminal.

Also, an invention according to claim 11 of the present application is a computer program configured to execute processing over a computer for operating as a server in a wireless communication system where a server and a client terminal mutually transfer information and are mutually synchronized by wireless communication, the program causing the computer to serve as: a communication unit configured to connect to a client terminal to perform communication; a contents analyzing unit configured to estimate the destination of a user who possess a client terminal; a movement predicting unit configured to estimate the current location of the client terminal, and also to predict a movement route from the current location to the destination; and a communication predicting unit configured to predict the communication quality of the client terminal over the predicted movement route to inform to the client terminal.

The computer program according to claim 11 of the present application is defined as a computer program described in a computer-readable format so as to realize predetermined processing over a computer. In other words, the computer program according to claim 11 of the present application is installed into a computer, whereby a collaborative operation can be exhibited over the computer, and the same advantages as with the information providing apparatus according to claim 1 of the present application can be obtained.

An invention according to claim 12 of the present application is a wireless communication apparatus which operates as a client terminal in a wireless communication system where a server and a client terminal mutually transfer information and are mutually synchronized by wireless communication, including: a communication unit configured to perform wireless communication with a base station or access point; and a control unit configured to control connection operation with a server via a base station or access point, and the operation of the communication unit, and the control unit controls connection operation with the server, and the operation of the communication unit based on a communication quality over the own predicted movement route.

An invention according to claim 13 of the present application is a wireless communication method including: a step arranged to obtain a predicted communication quality over the own movement route; and a step arranged to control wireless communication operation with a base station or access point, and connection operation with a server via a base station or access point based on the communication quality.

An invention according to claim 14 of the present application is a computer program configured to execute processing over a computer for operating as a client terminal in a wireless communication system where a server and a client terminal mutually transfer information and are mutually synchronized by wireless communication, the program causing the computer to serve as: a communication unit configured to perform wireless communication with a base station or access point; and a control unit configured to control connection operation with a server via a base station or access point, and the operation of the communication unit, and the control unit controls connection operation with the server, and the operation of the communication unit based on a predicted communication quality over the own movement route.

The computer program according to claim 14 of the present application is defined as a computer program described in a computer-readable format so as to realize predetermined processing over a computer. In other words, the computer program according to claim 14 of the present application is installed into a computer, whereby a collaborative operation can be exhibited over the computer, and the same advantages as with the information providing apparatus according to claim 1 of the present application can be obtained.

An invention according to claim 15 of the present application is a wireless communication system including: a server configured to estimate, based on a private content of a user who possesses a client terminal, the user's destination, to predict a movement route from the current location of the client terminal to the destination, to predict a communication quality of the client terminal over the predicted movement route, and to inform to the client terminal; and the client terminal configured to control connection operation with the server, and the communication operation based on the predicted communication quality over the movement route, and transfer of information and synchronous processing are performed between the sever and the client terminal.

Note however, that "system" mentioned here is a logical group configuration of multiple devices (or function modules for realizing a particular function), and is not restricted to each device or function module being within the same housing.

Advantageous Effects of Invention

According to the present invention, there can be provided an excellent information providing apparatus and information providing method, computer program, and wireless communication system, whereby information for performing transfer of information and synchronous processing with a server while reducing power consumption in an offline state wherein the server is not connected to a base station or access point can suitably be provided to a client terminal.

Also, according to the present invention, there can be provided an excellent wireless communication apparatus and wireless communication method, and computer program, whereby transfer of information and synchronous processing with a server can suitably be performed while reducing power consumption in an offline state wherein the server is not connected to a base station or access point.

With the inventions according to claims 1, 10 through 12, and 13 through 16 of the present application, a destination where the client terminal will move from now on can be predicted, a movement route from the current location of the client terminal to the destination can be predicted, and a location and time whereby the client terminal turns to an offline state over this movement route, and a location and time whereby the client terminal returns to an online state can be predicted. Such communication prediction information is then informed to the client terminal, whereby the client terminal can reduce power consumption accompanied with operating a communication function for searching a base station or access point at the time of offline. Also, the client terminal restores the communication function when reaching an online return predicted location or time, whereby transfer of information and synchronous processing with the server can be resumed.

With the inventions according to claims 2 and 3 of the present application, the destination of a moving client terminal can be predicted by analyzing the contents described in a user's private content, for example.

With the inventions according to claims 4 and 5 of the present application, the current location of a client terminal can be determined or estimated based on the sensor information of the client terminal.

With the invention according to claim 6 of the present application, a movement route from the current location to a destination can be predicted by a learning algorithm employing a hidden Markov model.

With the inventions according to claims 7 and 8 of the present application, a predicted movement route, and the communication information of each spot saved in the communication information database are compared, whereby the communication states of multiple wireless systems as to time or a location can be enabled. Specifically, the transfer rate, radio wave strength, and so forth within the serve area of each scattering access point are recognized, and a the connection state with a base station or access point of a client terminal over a movement route is predicted, whereby this communication prediction information can be informed to the client terminal.

With the inventions according to claim 9 of the present application, communication prediction information including a connection disabled state such as an offline predicted location or offline predicted time wherein a client terminal will reach the offline area, and a connectable condition such as an online return predicted location or online return predicted time wherein the client terminal returns to the online area, can be provided to the client.

With the invention according to claim 13 of the present application, a client terminal can restore the communication function to reduce power consumption when a connectable condition is satisfied by the client terminal reaching an online return predicted location or time based on location recognition or point-in-time recognition. Also, according to the inventions according to claims 13 and 14 of the present application, even in the event that the connectable condition is unsatisfied, when another predetermined condition is satisfied, each of the server and client terminal can release pause of connection to attempt connection.

Further objects, features, and advantages of the present invention will become apparent from more detailed description with the later-described embodiments of the present invention and the attached drawings.

BRIEF DESCRIPTION OF DRAWINGS

FIG. 5 is a diagram illustrating an operation example wherein a client terminal controls a communication function based on an offline predicted location and an online return predicted location informed from a server.

FIG. 6 is a diagram illustrating an operation example wherein a client terminal controls a communication function based on an offline predicted time and an online return predicted time informed from a server.

FIG. 8A is a flowchart (first half) illustrating processing procedures that a server and a client terminal execute respectively to realize the operations illustrated in FIG. 5 and FIG. 6.

FIG. 9A is a flowchart (first half) illustrating processing procedures that a server and a client terminal execute respectively to realize the operations illustrated in FIG. 5 and FIG. 6.

FIG. 9B is a flowchart (second half) illustrating processing procedures that a server and a client terminal execute respectively to realize the operations illustrated in FIG. 5 and FIG. 6.

DESCRIPTION OF EMBODIMENTS

Hereafter, embodiments of the present invention will be described in detail with reference to the drawings.

Figure 1:
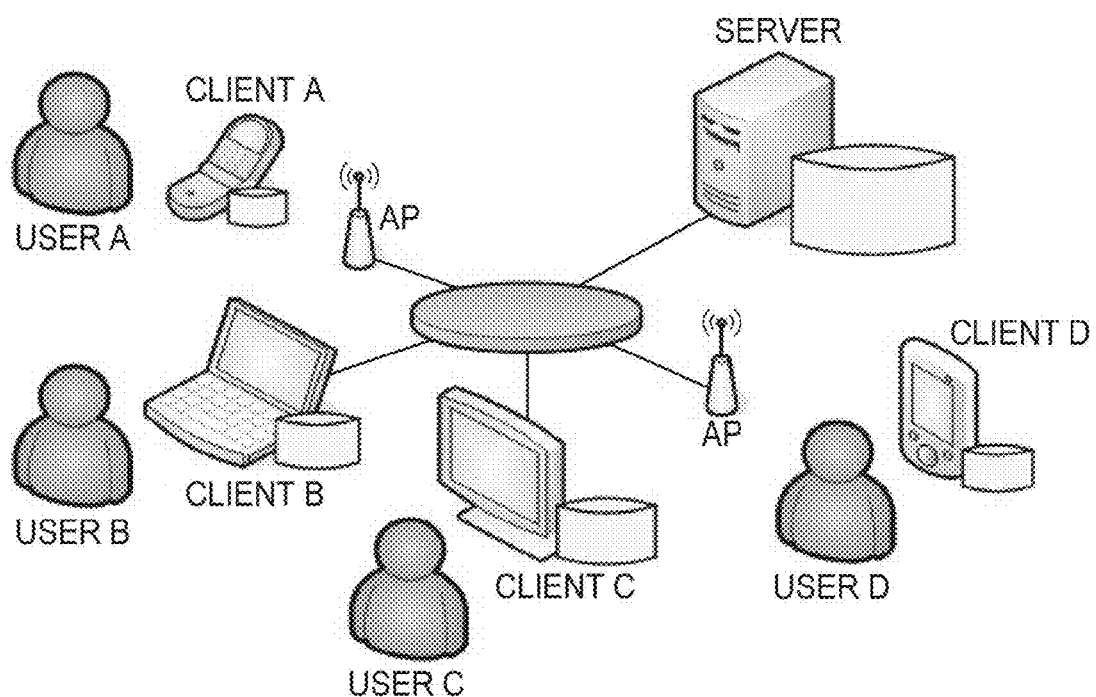
FIG. 1 is a diagram schematically illustrating a communication system according to an embodiment of the present invention.

FIG. 1 schematically illustrates the configuration of a communication system according to an embodiment of the present invention. With the illustrated communication system, transfer of information and synchronization are mutually performed between a server and a client terminal.

The network of the illustrated communication system is made up of a wired communication unit to be connected with a wired cable, and a wireless communication unit to be connected by radio wave communication. The wired communication unit is configured of a wired network such as an optical fiber or ADSL (Asymmetric Digital Subscriber Line) or the like. Also, the wireless communication unit is configured of a wireless network such as WiFi, W-CDMA (Wideband-Code Division Multiple Access), LTE (Long Term Evolution), WiMAX (Worldwide interoperability for Microwave Access) or the like, for example. The wireless communication unit can be connected via a base station or access point.

A server is connected to the wired communication unit. In FIG. 1, though only one server is drawn to simplify the drawing, multiple severs can be installed. The server holds all of the data of multiple users, and performs processing with multiple client terminals, such as transfer of information, synchronization, or the like.

The client terminals are connected to the communication system using either the wired communication unit or the wireless communication unit. With the example illustrated in FIG. 1, a client terminal B which a user B possesses, and a client terminal C which a user C possesses are each connected to the communication system using the wired communication unit.

Also, a client terminal A which a user A possesses, and a client terminal D which a user D possesses are each connected to the wireless communication unit via a nearest base station or access point (AP). The service area of each base station or access point is an "online area" where the client terminals A and D turn to an online state. Also, with an area other than the service area of either a base station or access point, the client terminals A and D turn to an offline state, and this area is equivalent to an "offline area".

New information is transferred from the server to the client terminals A through D. Also, the client terminals A through D perform synchronous processing with the server, and save necessary data in a storage device such as an own local disk or the like. With the present embodiment, a user's entire data is saved in the server, whereby the user can confirm his/her data in possession in the same way when logging into any client terminal.

The client terminals A and D are battery-driven mobile terminals, and it is desirable for the client terminals A and D to realize power saving by suspending the transmission/receiver when not needed, such as an offline state where the client terminals A and D are not housed in any service area.

Next, description will be made regarding the procedure of data exchange between the server and a client terminal in the communication system illustrated in FIG. 1, with reference to FIG. 2 through FIG. 4. Let us say here that a client terminal to be connected to the server will be connected to the wireless communication unit via a base station or access point.

Figure 2:
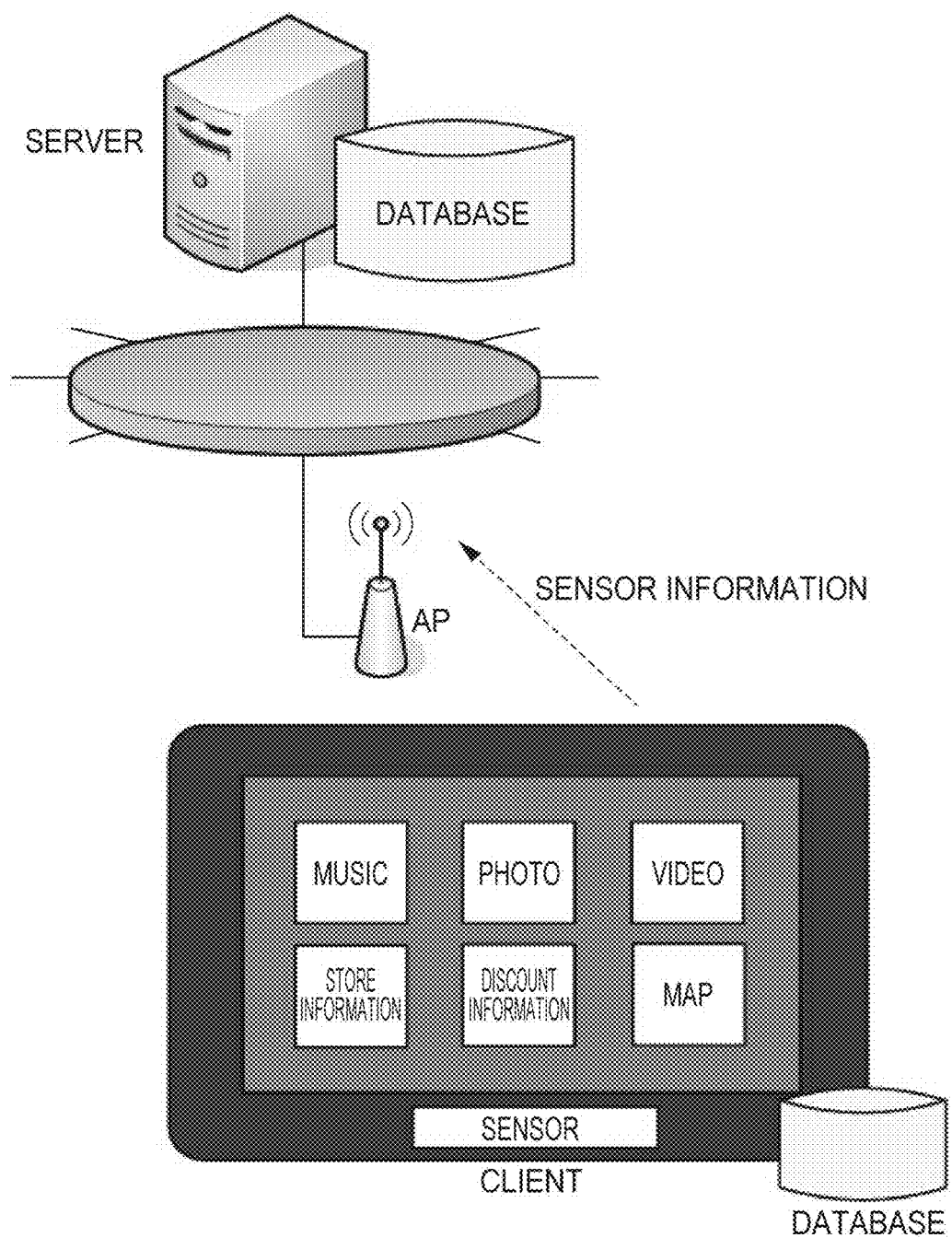
FIG. 2 is a diagram for describing a procedure of data exchange between a server and a client terminal in the communication system illustrated in FIG. 1.

In the event of a user has logged into a client terminal, the client terminal transmits sensor information used for location recognition extracted from a mounted sensor, to the server (see FIG. 2). Examples of the sensor information include sensor information for estimating the location information of a client terminal such as location information measured based on GPS (Global Positioning System) received radio waves, received signal strength information (RSSI: Receiving Signal Strength Indicator) of a WiFi base station, acceleration information measured by an acceleration sensor, or the like, or sensor information for estimating the mobile state of a client terminal such as an acceleration sensor, image recognizing apparatus, or the like.

The server has a communication information database which saves the communication information transmitted from multiple client terminals in the past, and recognizes the communication states of multiple wireless systems as to time and a location, i.e., recognizes a location registration map of the service area of each scattering access point, the transfer rate or radio wave strength within each service area, and so forth as the communication information. Also, the server includes a contents analyzing algorithm, a movement predicting algorithm, and a communication predicting algorithm.

The server estimates, based on the sensor information received from a client terminal, the current location or mobile state of the client terminal. Next, the server analyzes the contents of a private content (text information such as schedule, E-mail, and memo pad, or photographed image information or the like) of the client terminal internally saved as the database based on the contents analyzing algorithm, compares this analysis result with the estimated current location or mobile state of the client terminal, thereby performing the action prediction of the client terminal, i.e., the prediction of a destination to which the client terminal will move from now on. Next, the server calculates a movement route of the client terminal from the current location to the destination, based on the movement predicting algorithm.

The server then compares the predicted movement prediction information (destination, movement route) with the communication information such as the received radio wave strength of each access point, and so forth based on the movement predicting algorithm, thereby determining the future communication information of the client terminal, i.e., the connection disabled state and connection condition of the client terminal over the movement route. The connection disabled state is equivalent to that the client terminal is in an offline area where the client terminal cannot connect to any base station or access point. Also, the connection condition is equivalent to that the client terminal moves to an online area where the client terminal can be connected to any base station or access point.

Figure 3:
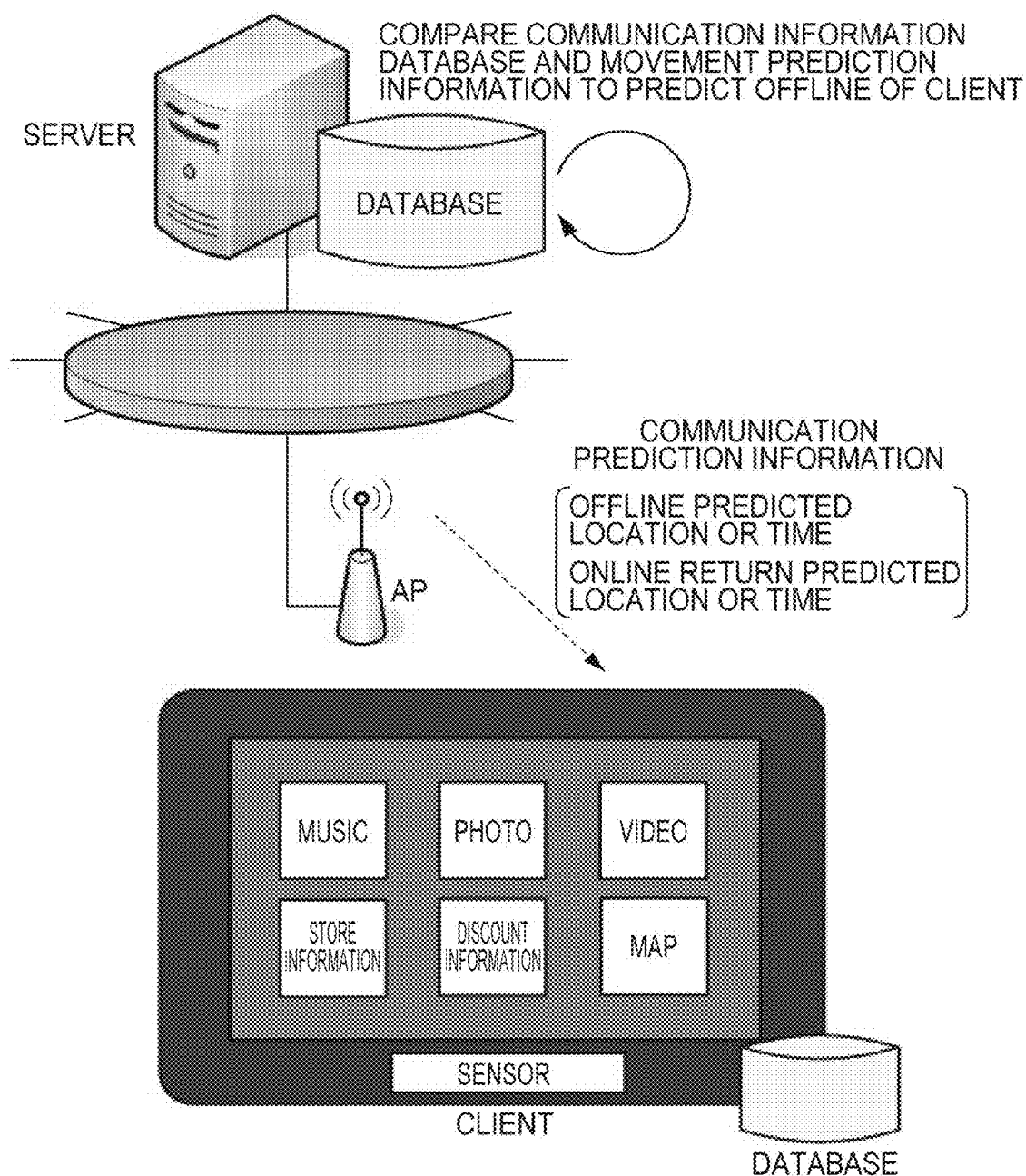
FIG. 3 is a diagram for describing a procedure of data exchange between a server and a client terminal in the communication system illustrated in FIG. 1.
Figure 4:
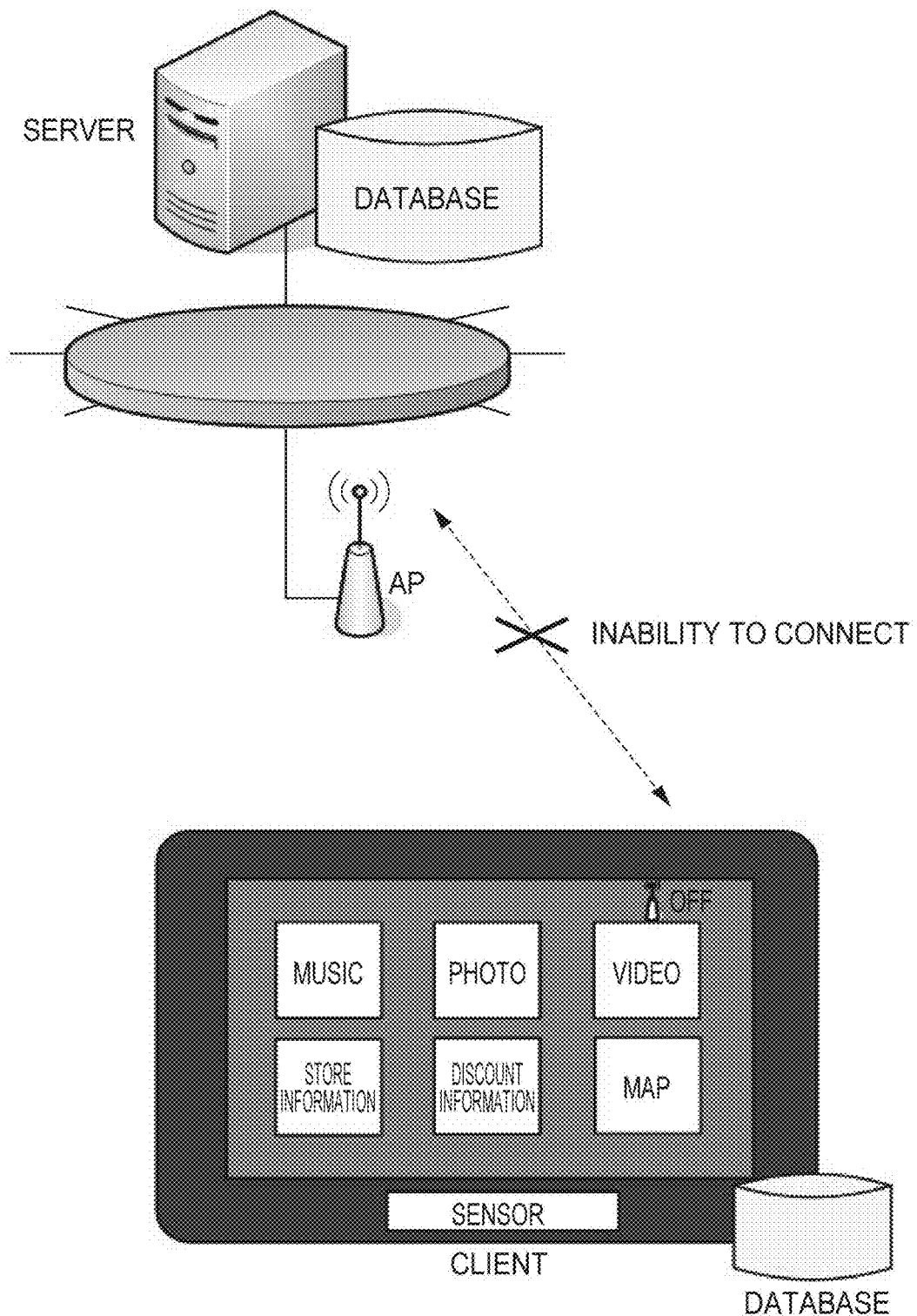
FIG. 4 is a diagram for describing a procedure of data exchange between a server and a client terminal in the communication system illustrated in FIG. 1.

In the event of having determined that there is a connection disabled state, i.e., an offline area over the movement route of the client terminal, the server predicts the connection disabled state and connectable condition of the client terminal, and transmits communication prediction information including these information before the client terminal turns to a connection disabled state (see FIG. 3). Specifically, the server calculates, as the connection disable state, an offline predicted location or offline predicted time wherein the client terminal will reach the offline area. Also, the server calculates, as the connectable condition, an online return predicted location or online return predicted time wherein the client terminal passes through the offline area and returns to the online area. Also, the server suspends connection with the client terminal predicted to be in a connection disabled state until the connection condition is satisfied. However, even in the event that the connection condition is not satisfied, when another predetermined condition is satisfied, the server may release suspension of connection with the client terminal to attempt connection with the client terminal (later described).

In the event of having received the communication prediction information including such predicted location or predicted time, the client terminal compares the current location recognized by the own location recognizing means such as its holding GPS, WiFi, acceleration sensor, or the like, or the current point-in-time recognized by the own time recognizing means with the offline predicted location or predicted time informed from the server. The client terminal then suspends the communication function when reaching a connection disabled state, i.e., the offline area.

The client terminal indicates notation during a period of autonomously suspending the communication function in the offline area whereby it can be found that the communication function has been suspended by the present system. FIG. 4 illustrates a scene where an icon indicating the offline state (OFF) is displayed on the upper right of a GUI (Graphical User Interface) screen of the client terminal.

When the connectable condition is satisfied, the client terminal then restores the communication function being suspended. Specifically, the client terminal compares the current location by the location recognizing means or the current point-in-time by the time recognizing means, held by itself with the online return predicted location or predicted time informed from the server, and restores the communication function being suspended when reaching the online area. Also, even in the event that the communicable condition is unsatisfied, when another predetermined condition is satisfied, the client may release suspension of the communication function to attempt connection with the server (later described).

Here, the offline area is an area where, due to a cause in that a client terminal is out of service from all service areas, the client terminal cannot communicate with the server. The offline predicted location is a location where the client terminal is predicted to arrive at the offline area over the movement route of the client terminal, and is calculated from a result of comparing the predicted movement route of the client terminal, and the location registration map of base stations and access points saved in the communication information database. The offline predicted time is point-in-time when the client terminal which is moving in accordance with the movement route is predicted to reach the offline area, and is calculated from the offline predicted location, and distance calculated from the movement route from the current location, and the moving speed of the client terminal.

Also, the online area is an area where the client terminal exists within any service area, and the client terminal can communicate with the server. The online return predicted location is a location where the client terminal is predicted to arrive the online area again over the movement route of the client terminal, and is calculated from a result of comparing the predicted movement route of the client terminal, and the location registration map of base stations and access points saved in the communication information database. The online return predicted time is point-in-time when the client terminal which is moving in accordance with the movement route is predicted to reach the online area, and is calculated from the online return predicted location, and distance calculated from the movement route from the current location, and the moving speed of the client terminal.

Also, to suspend the communication function of the client terminal means to suspend supply of power to the transmitter/receiver without performing even the intermittent reception that is performed in the power saving mode at the time of normal passive scan. Accordingly, with the present embodiment, the client terminal can reduce power consumption without performing intermittent reception in the offline area.

Note that, with the following description, in the case of distinguishing from the actual offline area, an offline area and an online area based on the prediction result of the server will be referred to as "offline predicted area" and "online predicted area" respectively, a location and point-in-time wherein the client terminal reaches the offline predicted area will be referred to as "offline predicted location" and "offline predicted point-in-time" respectively, and a location and point-in-time wherein the client terminal reaches the online predicted area will be referred to as "online return predicted location" and "online return predicted time" respectively.

Figure 7:
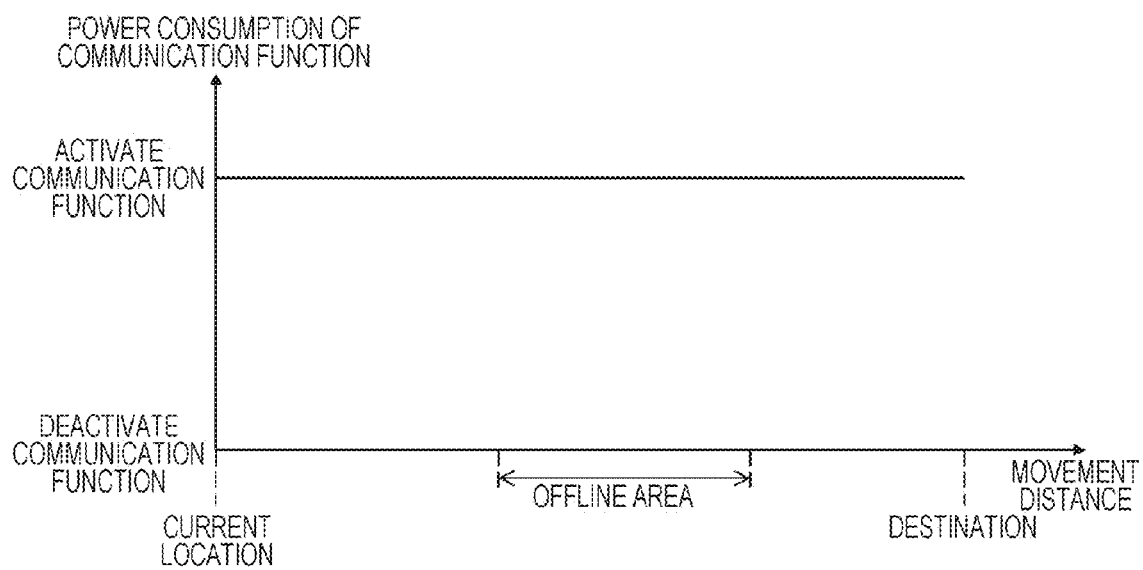
FIG. 7 is a diagram illustrating an operation example wherein a client terminal controls the communication function without notification of the communication information from a server.

Each of FIG. 5 and FIG. 6 illustrates an operation example wherein the client terminal controls the own communication function based on the communication prediction information informed from the server. Also, FIG. 7 illustrates an operation example wherein the client terminal controls the communication function with no notification of the communication information from the server in contrast with FIG. 5 and FIG. 6.

With the example illustrated in FIG. 5, the server has informed the offline predicted location and online return predicted location to the client terminal as communication prediction information.

In the event of having received these communication prediction information, the client terminal compares the current location recognized by location recognizing means which it itself possesses with the informed offline predicted location. The client terminal then suspends the communication function when the current location reaches the offline predicted location. In a state in which the communication function is suspended, supply of power to the transmitter/receiver is suspended as illustrated in the drawing.

With the power saving mode at the time of normal passive scan, intermittent reception of a beacon is performed even in a state in which not communication is performed. On the other hand, with the present embodiment, the client terminal does not perform even intermittent reception after suspending the communication function, and accordingly, the effect of power saving is high.

Also, the client terminal compares, in an offline state, the current location recognized by the location recognizing means which it itself possesses with the informed online return predicted location. The client terminal then restores the communication function when the current location reaches the online return predicted location.

Here, the location recognizing means which the client terminal possesses can measure the current location information based on, for example, GPS received radio waves, the received radio wave strength (RSSI) of a WiFi base station, the integrated result of the acceleration information of an acceleration sensor, or the like. For example, "PlaceEngine (registered trademark)" has been known as a technique for obtaining the power measurement information from a WiFi access point located on the periphery to measure the current location in real time. Alternatively, the mobile state of the client terminal can be estimated based on the acceleration information measured by an acceleration sensor, the image recognition result by an image recognizing device, or the like.

The client terminal can more accurately perform control of the communication function in the event of finely obtaining location information using the location recognizing means. With the example illustrated in FIG. 5, the client terminal arrives at the offline predicted location prior to the actual offline area, and arrives at the online return predicted location prior to the actual online return location.

With the example illustrated in FIG. 6, the server has informed the offline predicted time and online return predicted time to the client terminal as the communication prediction information.

In the event of having received these communication prediction information, the client terminal compares the current point-in-time recognized by time recognizing means which it itself possesses with the informed offline predicted time. Upon the current point-in-time reaching the offline predicted time, the client terminal then suspends the communication function. In a state in which the communication function has been suspended, the client terminal suspends supply of power to the transmitter/receiver as illustrated in the drawing. With the present embodiment, the client terminal does not perform even intermittent reception after suspending the communication function, and accordingly, the effect of power saving is high as compared to the power saving mode at the time of normal passive scan, or the like (the same as above).

Also, the client terminal compares, in an offline state, the current point-in-time recognized by time recognizing means which it itself possesses with the online return predicted time.

Upon the current point-in-time reaching the online return predicted time, the client terminal then restores the communication function.

On the other hand, with the example illustrated in FIG. 7, the server does not inform the communication prediction information relating to the predicted location and predicted time relating to arrival to the offline area, and return to the online area to the client terminal at all. The client terminal successively performs intermittent beacon reception operation in the power saving mode at the time of passive scan while suspending transmission operation. That is to say, even when arriving at the offline area, the power consumption of the client terminal does not peculiarly decrease.

Note that whether to perform control of the communication function with which of the location information or time information differs for each system. For example, in the event of performing location recognition for every certain period of time, the current point-in-time may reach the predicted time on ahead. Also, in the event that the client terminal includes no location recognizing means, control has to be performed using the time recognizing means alone as illustrated in FIG. 6.

Figure 8B:
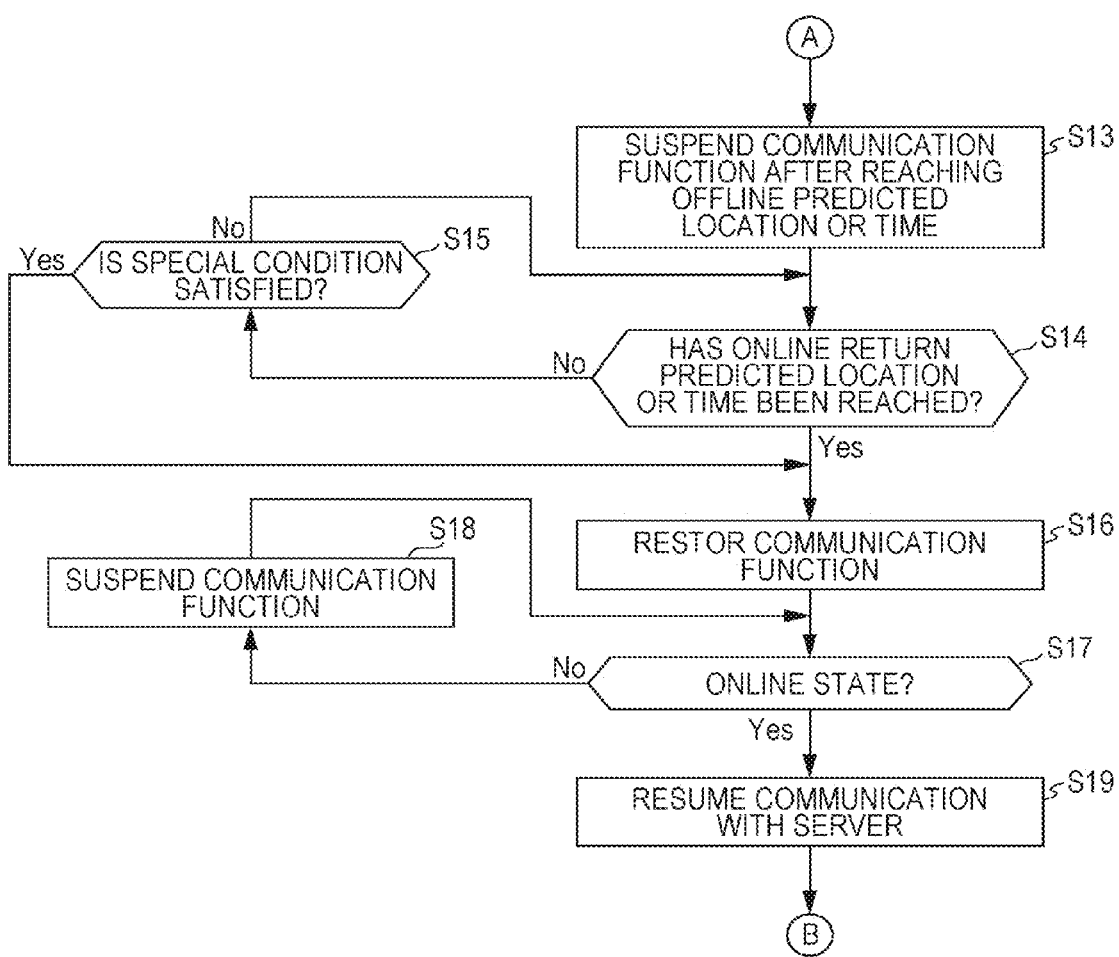
FIG. 8B is a flowchart (second half) illustrating processing procedures that a server and a client terminal execute respectively to realize the operations illustrated in FIG. 5 and FIG. 6.

FIG. 8A and FIG. 8B illustrate a processing procedure that the server and client terminal execute respectively for realizing the operations illustrated in FIG. 5 and FIG. 6, in a flowchart format. With the processing procedure illustrated in the drawings, let us say that the client terminal basically performs determination of the own offline state/online state using the communication prediction information received from the server.

In the event of a user having logged into a client terminal (step S11), the client terminal transmits sensor information used for location recognition extracted from a mounted sensor to the server (step S12). With this processing procedure, let us say that the client terminal transmits the sensor information to the server with relatively high frequency.

Upon receiving the above sensor information from the client terminal, the server determines or estimates the current location of each client terminal based on the sensor information saved in the sensor information database (step S1).

Next, the server analyzes the contents of a private content (text information such as schedule, E-mail, memo pad, or the like, or photographed image information, or the like) of a client terminal saved in a private content database (described later) based on the contents analyzing algorithm to perform prediction of a destination where the client terminal will move from now on (step S2).

Next, the server calculates the movement route of the client terminal from the current location determined or estimated from the sensor information to the above predicted destination based on the movement predicting algorithm (step S3).

The server includes a communication information database which saves the communication information transmitted from multiple client terminals in the past, and recognizes the communication states of multiple wireless systems as to time and a location, i.e., the transfer rate, radio wave strength, and so forth within the service area of each scattering access point (described above). Upon obtaining the movement route of the client terminal by step S3, the server further predicts the future communication information of the client terminal based on the communication predicting algorithm. Specifically, the server compares the predicted movement prediction information (destination, movement route) with the communication information such as the received radio wave strength of each access point, or the like, thereby determining whether or not there is an offline area over the predicted movement route (step S4).

In the event that determination is made that the client terminal is in an offline area (Yes in step S4), the server calculates the offline predicted location or offline predicted time, and online return predicted location or online return predicted time of the client terminal (step S5), and transmits these calculated information to the client terminal as the communication prediction information (step S6).

Here, the offline predicted location is calculated from a result of comparing the movement route of the client terminal predicted by the server with the location registration map of base stations and access points held by the server. The offline predicted time is calculated from distance calculated from the offline predicted location and the movement route from the current location, and the moving speed of the client terminal.

With this processing procedure, let us say that the client terminal transmits the sensor information used for location recognition to the server with relatively high frequency (described above), and the communication prediction information is also transmitted from the server with high frequency (step S6). In such a case, the client terminal can estimate that the current location has reached the offline predicted location, or the current point-in-time is the offline predicted point-in-time, at the instant of receiving the communication prediction information from the server. Accordingly, in response to the communication prediction information being received from the server, the client terminal suspends the communication function (step S13). At this time, the server side may also suspend connection with the client terminal predicted to be in an offline state.

Upon suspending the communication function, the client terminal does not perform even intermittent reception to be performed in the power saving mode at the time of normal passive scan, and accordingly, power consumption can be reduced (see FIG. 5 and FIG. 6).

The client terminal compares, in an offline state, the current location according to the location recognizing means which it itself possesses, or the current point-in-time according to the time recognizing means with the online return predicted location or online return predicted time informed from the server (step S14), holds the offline state until the current location or current point-in-time reaches the online return predicted location or online return predicted time, and continuously suspends the communication function.

Thereafter, when the current location or current point-in-time reaches the online return predicted location or online return predicted time (Yes in step S14), the client terminal restores the communication function being suspended (step S16). At this time, when predicting that the client terminal returns to an online state, the server side also resumes connection with the client.

The online return predicted location is calculated from a result of comparing the movement route of the client terminal predicted by the server with the location registration map of base stations and access points held by the server. The online return predicted time is calculated from the online return predicted location, the distance calculated from the movement route from the current location, and the moving speed of the client terminal.

Also, even in the event that the online return predicted location or online return predicted time has not been reached, i.e., a condition for restoring the communication function is not satisfied (No in step S14), when satisfying a predetermined particular condition (Yes in Step S15), the client terminal restores the communication function being suspended (step S16).

As an example of a particular condition mentioned here, a case can be given wherein difference between the online return predicted location or online return predicted time predicted by the server, and the current location or current point-in-time actually measured by the client terminal is equal to or greater than a stipulated value. That is because in the case that such a phenomenon occurs, the probability that the movement prediction or communication prediction of the client terminal by the server was an error is high, the client terminal is also estimated to have encountered the online area, and accordingly, early return to the online state should be attempted.

Also, it may be included as a particular condition that the user has instructed return to the online state using manual operations. This is because, even if the client terminal is predicted to be in an offline area by a collaborative operation between the server and the client terminal, the user may detect that the current location is in the online area, and accordingly, the user's determination has to be respected.

In the event that the client terminal performs control of the communication function depending on the communication prediction information alone from the server instead of the own sensor information, even if a notification of the sensor information by the client terminal, and a notification of the communication prediction information from the server are performed with relatively high frequency, there is concern that there is error between the current location or time and the communication prediction information. Accordingly, it can be conceived that it is desirable for the client terminal side to have an arrangement to return from the offline state to the online state, as with step S15.

After restoring the communication function (step S16), the client terminal checks whether to have been able to return to the online state, i.e., whether to have been able to connect to the nearest base station or access point (step S17).

In the event that the client terminal determines whether to be in an online state depending on the communication prediction information from the server instead of the own sensor information, in reality there may be a case where the client terminal has not reached the offline area yet, and accordingly cannot return to the online state. Therefore, in the event that the client terminal is not able to return to the online state yet (No in step S17), the client terminal temporarily suspends the communication function (step S18) to avoid consumption of wasteful power. Note that the server side may also suspend connection with the client terminal predicted to be in an offline state.

Also, in the event that the client terminal has succeeded to return to the online state (Yes in step S17), the client terminal resumes connection with the server (step S19). The client terminal then connects to the server to perform processing such as transfer of information, synchronization, or the like. The server side also resumes connection with the client when predicting that the client terminal will return to the online state.

Thereafter, the client terminal returns to step S12, and transmits the sensor information to the server with predetermined frequency.

FIG. 9A and FIG. 9B illustrate another example of a processing procedure that the server and client terminal execute respectively for realizing the operations illustrated in FIG. 5 and FIG. 6, in a flowchart format. With the processing procedure illustrated in the drawings, let us say that though the client terminal receives the communication prediction information from the server, it itself also includes a communication information database, and can accurately recognize the location information of the offline area and online area based on the own location recognizing means.

Upon the user having logged into the client terminal (step S31), the client terminal obtains sensor information used for location recognition from the mounted sensor to transmit to the server with relatively low frequency (step S32).

Upon receiving the above sensor information from the client terminal, the server determines or estimates the current location of each client terminal based on the sensor information saved in the sensor information database (step S21).

Next, the server analyzes the contents of a private content (text information such as schedule, E-mail, memo pad, or the like, or photographed image information, or the like) of a client terminal saved in a private content database (described later) based on the contents analyzing algorithm to perform prediction of a destination where the client terminal will move from now on (step S22).

Next, the server calculates the movement route of the client terminal from the current location determined or estimated from the sensor information to the above predicted destination based on the movement predicting algorithm (step S23).

The server includes a communication information database which saves the communication information transmitted from multiple client terminals in the past, and recognizes the communication states of multiple wireless systems as to time and a location, i.e., the transfer rate, radio wave strength, and so forth within the service area of each scattering access point (described above). Upon obtaining the movement route of the client terminal by step S23, the server further predicts the future communication information of the client terminal based on the communication predicting algorithm. Specifically, the server compares the predicted movement prediction information (destination, movement route) with the communication information such as the received radio wave strength of each access point or the like, thereby determining whether or not there is an offline area over the predicted movement route (step S24).

In the event that determination is made that the client terminal is in an offline area (Yes in step S24), the server calculates the offline predicted location or offline predicted time, and online return predicted location or online return predicted time of the client terminal (step S25), and transmits these calculated information to the client terminal as the communication prediction information (step S26).

With this processing procedure, the client terminal transmits the sensor information used for location recognition to the server with relatively low frequency (described above), and the communication prediction information is also transmitted from the server with low frequency (step S26).

Upon receiving the communication prediction information including these predicted location or predicted time from the server, the client terminal compares the current location recognized by the location recognizing means such as a GPS, WiFi, acceleration sensor, or the like which it itself holds, or the current point-in-time recognized by the time recognizing means with the offline predicted location or predicted time informed from the server. Upon reaching the offline predicted area, the client terminal then suspends the communication function (step S33).

In the online state, the client terminal refers for the current location according to the location recognizing means which it itself holds to the own communication information database (step S34) to check whether to come closer to the offline area (step S35). Upon coming closer to the offline area, the client terminal suspends the communication function (step S36). At this time, the server side may also suspend connection with a client terminal predicted to be in an offline state.

Upon suspending the communication function, the client terminal does not perform even intermittent reception to be performed in the power saving mode at the time of normal passive scan, and accordingly, power consumption can be reduced (see FIG. 5 and FIG. 6).

The client terminal refers, in an offline state, for the current location according to the location recognizing means which it itself possesses to the own communication information database to check whether to come closer to the online area (step S37). Upon coming closer to the online area (Yes in step S37), the client terminal restores the communication function being suspended (step S38). At this time, the server side also resumes connection with the client when predicting that the client terminal will return to the online state.

Note that, with the processing procedure illustrated in FIG. 9A and FIG. 9B, the client terminal can accurately recognize the location information of the offline area and online area based on the own location recognizing means (described above), and accordingly, in contrast to the processing procedure illustrated in FIG. 8A and FIG. 8B, there is no need to restore the communication function in response to a particular condition being satisfied, or to temporarily suspend the communication function by recognizing an offline state after restoring the communication function.

Upon restoring the communication function, the client terminal connects to the server to perform processing such as transfer of information, synchronization, or the like. Thereafter, the client terminal returns to step S32, and transmits the sensor information to the server with predetermined frequency.

Figure 10:
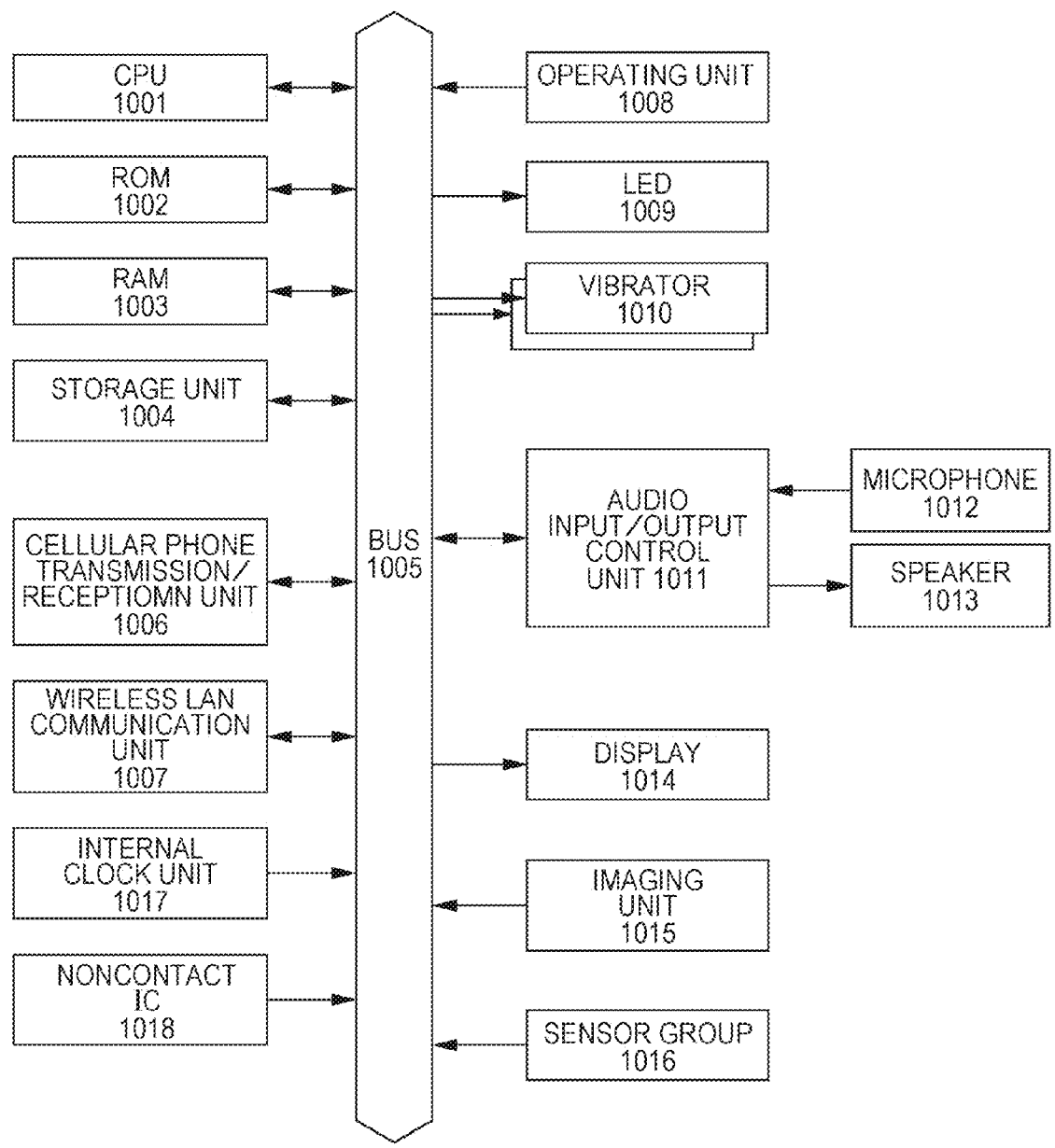
FIG. 10 is a diagram illustrating a configuration example of information equipment which operates as a user's client terminal.

FIG. 10 illustrates a configuration example of information equipment which operates as a user's client terminal such as a cellular phone. In this drawing, though the configuration of the power system within the equipment such as battery and so forth is omitted, let us say that this client terminal is a battery-driven terminal.

A CPU (Central Processing Unit) 1001 controls the operation of each unit to execute various types of processing in accordance with the program stored in ROM (Read Only Memory) 1002, or the program loaded to RAM (Random Access Memory) 1003 from a storage unit 1004. Data necessary for executing various types of processing, and so forth are also stored in the RAM 1003 as appropriate.

The CPU 1001, ROM 1002, and RAM 1003 are mutually connected via a bus 1005. Also, the bus 1005 is connected to the storage unit 1004, a cellular phone transmission/reception unit 1006, a wireless LAN communication unit 1007, an operating unit 1008, an LED 1009, a vibrator 1010, an audio input/output control unit 1011, a microphone 1012, an audio input/output control unit 1013, a display 1014, an imaging unit 1015, a sensor group 1016, an internal clock unit 1017, and a noncontact IC module 1018. With this information equipment, a moving image or still image can be taken using the imaging unit 1015.

The cellular phone transmission/reception unit 1006 can operate as a cellular wireless transmitter/receiver which completely functions, in accordance with an optional known standard including a standard such as, for example, W-CDMA, LTE, or the like.

The wireless LAN communication unit 1007 can operate in accordance with a typical wireless LAN standard such as WiFi, WiMAX, or the like. With the present embodiment, let us say that the wireless LAN communication unit 1007 can completely suspend the communication function in accordance with the command from the CPU 1001 in addition to performing intermittent reception operation under the power saving mode at the time of passive scan.

The operating unit 1008 is configured of buttons, a jog dial, and so forth, and accepts the operations from the user. Examples of user operations include text input such as E-mail creation, schedule entry, and so forth in addition to phone number input, and various settings. The LED 1009 is emitted to direct the user's attention to this information equipment at the time of presenting information to the user, for example. Also, the vibrator 1010 adds vibration to this equipment body for directing the user's attention thereto at the time of an incoming call or the like, for example.

The microphone 1012 converts the user's voice into electric audio signals, and the speaker 1013 converts the audio signals into audible signals whereby the user can listen to these. The audio input/output control unit 1011 supplies basic analog output signals to the speaker 1013, and also receives analog audio input from the microphone 1012.

The display 1014 allows the operator to view a numeric dialed by the operator, an image, a call-up situation, menu options, and other service information at the time of using this equipment as a common cellular phone. Also, at the time of taking an image using the imaging unit 1015, this display 1014 can be used for display/playing output of a through image or shot image.

The imaging unit 1015 includes an optical system, an image sensor, and an image processor (neither is illustrated). The optical system is made up of a single lens or multiple lenses, and the image sensor captures an image formed by the optical system. The image processor processes the compressed image data or RAW image data captured by the image sensor for storage to the storage unit 1004, output to the display 1014, or transmission according to the cellular phone transmission/reception unit 1006 or wireless LAN communication unit 1007. An imaged image according to the imaging unit 1015 is a private content. Also, an imaged image according to the imaging unit 1015 is subjected to image recognition, whereby this image can be sensor information for estimating the mobile state of this client terminal.

With the present embodiment, let us say that the sensor group 1016 includes one or more sensors whereby sensor information that can be used for location recognition can be obtained. Examples of this type of sensor include a GPS module, an acceleration sensor module, and a geomagnetic sensor module.

The internal clock unit 1017 supplies point-in-time information such as the current point-in-time to the system. The arrival of the offline predicted time and online return predicted time can be estimated based on the point-in-time information clocked by the internal clock unit 1017.

An example of the noncontact IC module 1018 includes a proximity-type IC module conforming to ISO/IEC 14443 such as FeliCa (registered trademark) or the like, and can be used for authentication processing or accounting processing. Traffic history and purchase history can be obtained from the noncontact IC module 1018.

Figure 11:
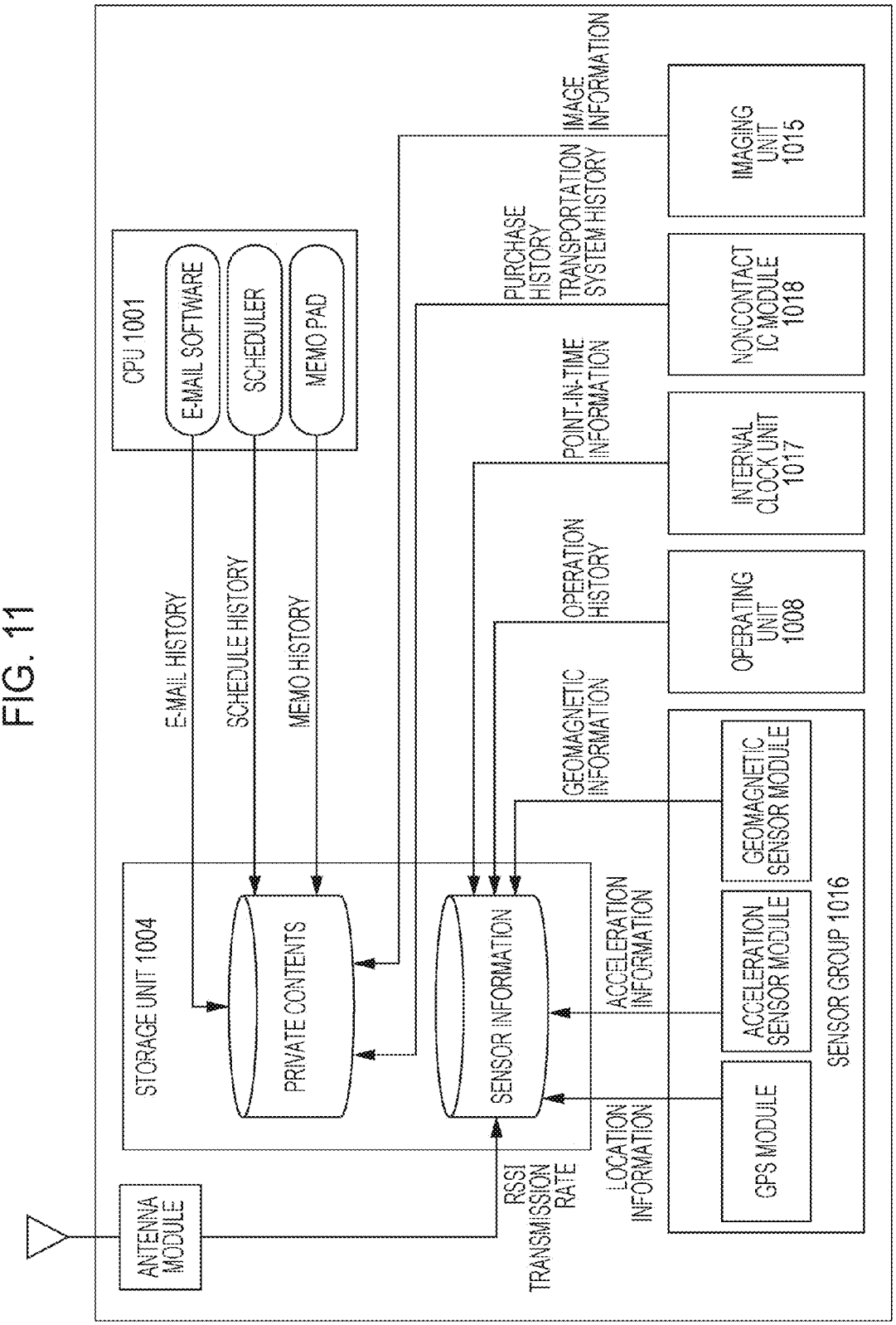
FIG. 11 is a diagram schematically illustrating a functional configuration for a client terminal transmitting a private content or sensor information.

With the present embodiment, when the information equipment (see FIG. 10) operates as a client terminal, in order to realize a collaborative operation with the server as illustrated in FIG. 5 and FIG. 6, the information equipment includes a function for transmitting a private content or sensor information to the server. FIG. 11 schematically illustrates a functional configuration for a client terminal transmitting a private content or sensor information.

Examples of a private content includes E-mail history, schedule history, memo history, and so forth processed through an application such as E-mail software, scheduler, memo pad, or the like, executed by the CPU 1001. In addition, a user's login ID, login time and date, login location, logoff time and date, logoff location, transportation system history, image information taken by the imaging unit 1015, accounting information such as purchase history or transportation system history or the like performed by the noncontact IC module 1018, and action history such as the operation history of various types of equipment may be included in private contents. These private contents are stored in the storage unit 1004, and are transferred to the server at optional timing serving as the online state of a client terminal.

Let us say that the sensor information is sensor information measured by the sensor group 1016, and includes one or more pieces of information that can be used for location recognition. Examples of the sensor information include location information obtained by the GPS module, acceleration information obtained by the acceleration sensor module, and geomagnetic information obtained by the geomagnetic sensor module. Further, the operation history that the user has performed as to the operating unit 1008, the point-in-time information clocked by the internal clock unit 1017 may be included in the sensor information. Also, alternatively, sensor information for estimating the mobile state of a client terminal such as the image recognition results of an imaged image according to the acceleration sensor or imaging unit 1015 may be included.

Also, it is known by this industry that the communication information such as transfer rate, received radio wave strength, and so forth can be used for location recognition. Therefore, the transfer rate obtained by the antenna module made up of the cellular phone transmission/reception unit 1006, wireless LAN communication unit 1007, and so forth, and the received radio wave strength of a base station or access point may be included in the sensor information.

These sensor information is stored in the storage unit 1004, and is transferred to the server with a predetermined frequency in an online state after the user has logged into a client terminal.

Figure 12:
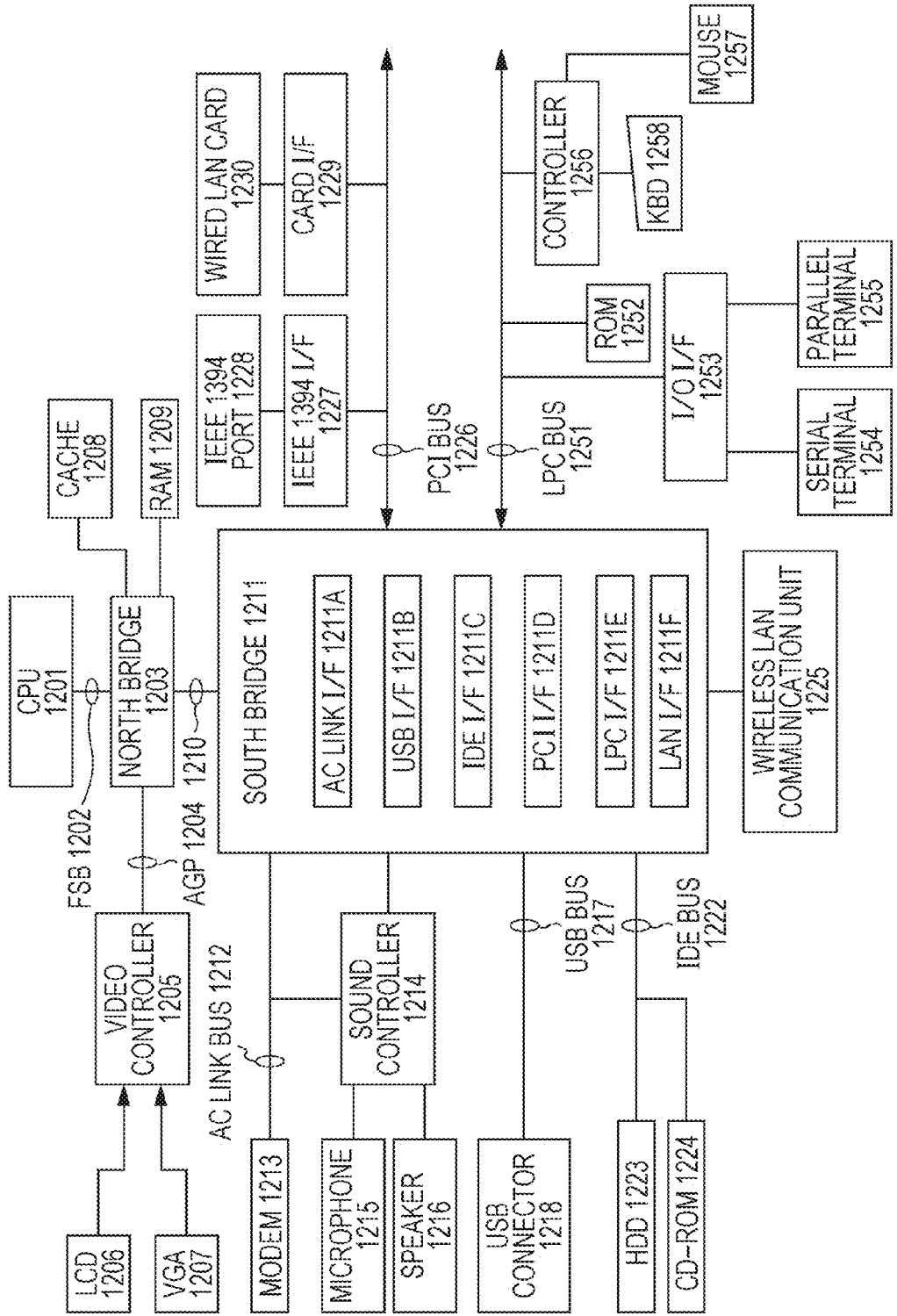
FIG. 12 is a diagram illustrating a configuration example of information equipment which operates as a server.

FIG. 12 illustrates a configuration example of information equipment which operates as a server. The server can be built with a mode wherein a predetermined server application is activated over a common computer system, for example, such as a personal computer.

A CPU 1201 executes various types of application programs under an execution environment provided by an operating system. The operating system (OS: Operating System) is a program for controlling the basic operations of a computer, for example, represented by so-called Windows (registered trademark) XP of Microsoft Corporation, or so-called Mac OS (registered trademark) of Apple Computer, Inc.

The CPU 1201 is connected to a front side bus (FSB) 1202, and the FSB 1202 is further connected to a north bridge 1203. The north bridge 1203 incldues an AGP (Accelerated Graphics Port) 1204 and a hub interface 1210.

The north bridge 1203 is connected to cache memory 1208, and RAM 1209 which is the main memory, and controls an access operation to these memory devices. The RAM 1209 is configured of, for example, DRAM (Dynamic RAM), and stores a program that the CPU 1201 executes, or work data necessary for the operation of the CPU 1201. The cache memory 1208 is configured of a memory device such as SRAM (Static RAM) which can execute a higher-speed writing or reading operation, and caches, i.e., temporarily stores a program or data that the CPU 1201 uses.

Also, the north bridge 1203 is connected to a video controller 205 via the AGP 1204. The video controller 1205 generates image data corresponding to the data received from the CPU 1201, or stores the image data received from the CPU 1201 in built-in video memory (not illustrated) without change, and also displays an image corresponding to image data within the video memory on an LCD 1206 or VGA 1207.

Here, the VGA 1207 is a VGA (Video Graphics Array) type display. The LCD 1206 or VGA 1207 displays an image or text based on the data supplied from the video controller 1205.

Also, the north bridge 1203 is mutually connected to the south bridge 1211 via the hub interface 210. The south bridge 1211 houses an AC link interface 1211A, a USB (Universal Serial Bus) interface 1211B, an IDE (Integrated Drive Electronics) interface 1211C, a PCI (Peripheral Component Interconnect) interface 1211D, an LPC (Low Pin Count) interface 1211E, a LAN interface 1211F, and so forth, and controls the input/output operations and so forth of various devices to be connected thereto via a device to be connected to the AC link bus 1212, USB bus 1217, or IDE bus 1222.

The AC link bus 1212 is connected to a modem 1213, a sound controller 1214, and so forth. The sound controller 1214 captures audio form a microphone 1215, generates data corresponding to the audio thereof, and outputs to the RAM 1209. Also, the sound controller 1214 drives and causes a speaker 1216 to output the audio.

The USB bus 1217 can be connected to various USB devices via a USB connector 1218. The USB interface 1211B transmits data to a USB device (not illustrated) connected thereto via the USB bus 1217, and also receives data from the device.

The IDE interface 1211C is configured of two IDE controllers of a primary IDE controller, and a secondary IDE controller, and a configuration register, and so forth (neither is illustrated). The primary IDE controller is connected to an HDD (Hard Disk Drive) 1223 via the IDE bus 1222. Also, an IDE device such as a CD-ROM drive 1224 or HDD (not illustrated) or the like is mounted on the secondary IDE controller.

Various application programs to be executed at the CPU 1201 are installed into the HDD 1223. Also, various types of data and various contents can be saved in the HDD 1223. With the present embodiment, the communication information database, sensor information database, and private content database are built using the HDD 1223.

A wireless LAN communication unit 1225 is connected to a network using wireless LAN communication, for example, such as IEEE802.11a/b or the like. The LAN interface 211F transmits data to the network connected to the wireless LAN communication unit 1225, and also receives data. This computer system which operates as the server may perform transfer of information, synchronization, or the like with a client terminal via the wireless LAN.

An LPC bus 1251 is connected to ROM 1252, I/O (Input/Output) interface 1253, and a controller 1256. BIOS (Basic Input Output System) and so forth are stored in the ROM (Read Only Memory) 1252. Here, BIOS is made up of a basic input/output command group, and controls input/output of data between the OS or an application program and a peripheral device.

The I/O interface 1253 is connected to a serial terminal 1254 and a parallel terminal 1255, and performs serial input/output and parallel input/output of data with devices connected to the terminals. The controller 1256 can be connected to user input devices such as a keyboard 1258, a mouse 1257, and so forth.

The PCI bus 1226 is connected to a card interface 1229, an IEEE1394 interface 1227, and other unshown PCI devices. The card interface 1229 supplies the data supplied from an expansion card connected to a card slot (not illustrated) to the CPU 1201 or RAM 1209, and also outputs the data supplied from the CPU 1201 to the expansion card connected to the above slot. An example of the expansion card is a wired LAN card 1230. In the event that the information equipment illustrated in the drawing operates as a server, processing such as transfer of information, synchronization, or the like with a client terminal is performed via the wired LAN card 1230. Also, the IEEE1394 interface 1227 transmits/receives data (data stored in packets) conforming to the IEEE1394 standard via an IEEE1394 port 1228.

Figure 13:
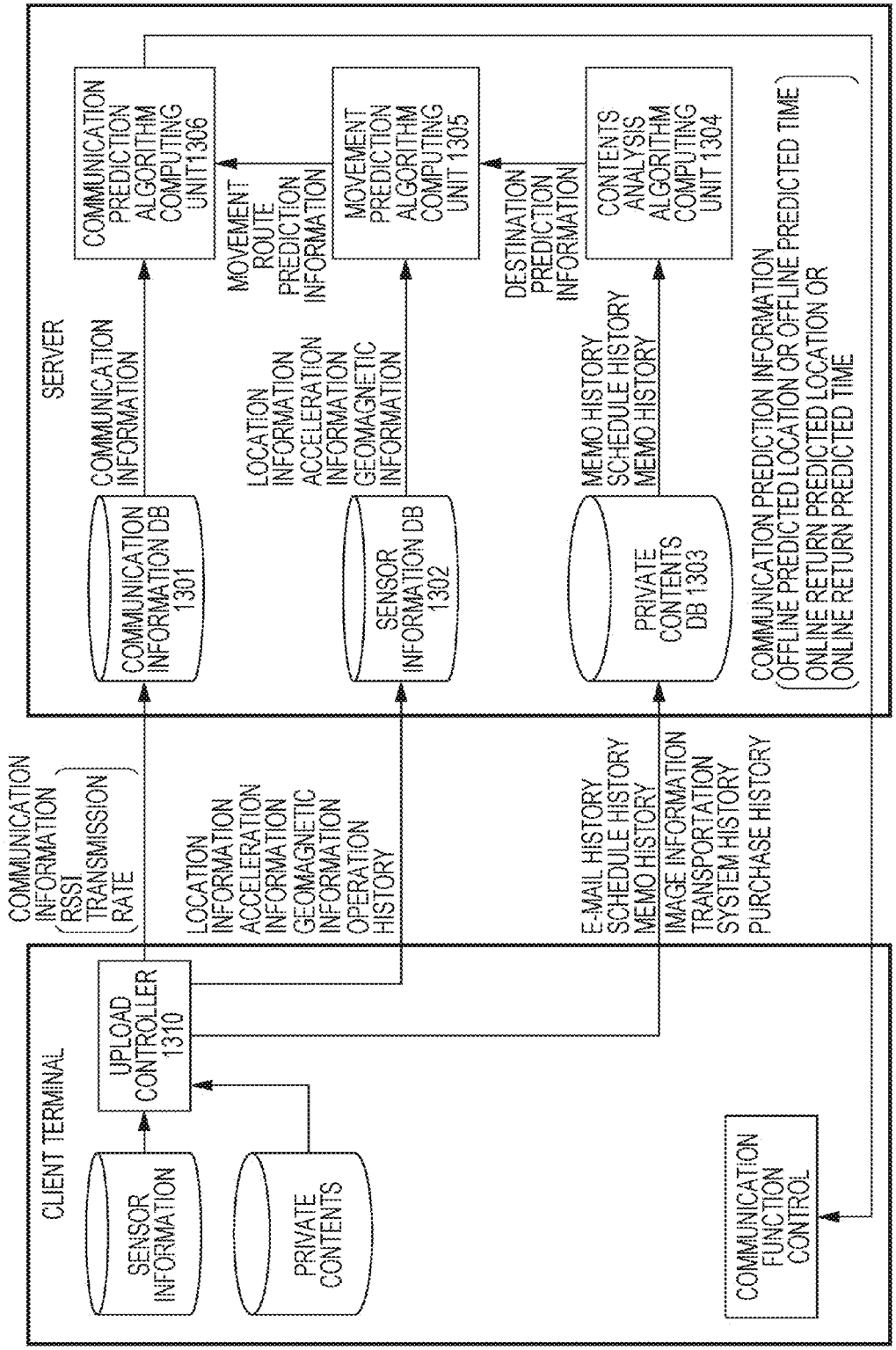
FIG. 13 is a diagram illustrating a configuration example of information equipment which operates as a server.

With the present embodiment, when the information equipment (see FIG. 12) operates as the server, the server receives communication information, a private content, and sensor information from a client terminal, and transmits communication prediction information to the moving client terminal. FIG. 13 schematically illustrates a functional configuration for the server providing communication prediction information according to a collaborative operation with a client terminal.

The server includes a communication information database 1301, a sensor information database 1302, and a private content database 1303. These databases are built with the HDD 1223.

The communication information database 1301 saves the communication information such as a transfer rate, received radio wave strength, and so forth transmitted from multiple client terminals in the past. However, the essence of the present invention is not restricted to a method for building a communication information database based on the communication information collected from multiple client terminals, and the communication information database may be built by another method. The server can recognize the communication states of multiple wireless systems as to time and a location, i.e., a transfer rate, radio wave strength, and so forth within the service area of each scattering access point based on the communication information database 1301.

The sensor information database 1302 saves the sensor information transmitted from multiple client terminals in the past. The sensor information mentioned here includes sensor information that can be used for location recognition, such as location information measured based on received radio waves of GPS, the received signal strength information (RSSI) of a WiFi base station, acceleration information measured by the acceleration sensor, and so forth, which are mounted on the client terminals. The server can determine or estimate the current location of each client terminal based on the sensor information saved in the sensor information database 1302.

The private content database 1303 saves the private contents (text information such as a schedule, E-mail, memo pad, and so forth, shot image information, purchase history, transportation system history, and so forth) transmitted from multiple client terminals in the past. For example, the server can predict the destination of a moving client terminal by analyzing the contents of a private content saved in this database. However, the usage of the private content database is not restricted to prediction of a destination.

It is as described above that sensor information and private contents are saved in the storage unit 1004 on a client terminal side. An upload controller 1310 is a function module to be realized by the CPU 1001 executing a predetermined application program, for example. The upload controller 1310 uploads communication information such as received radio wave strength and a transfer rate and so forth to the communication information database 1301 on the server side, uploads sensor information such as location information, acceleration information, geomagnetic information, purchase history/transportation system history, and so forth to the sensor information database 1302, and uploads a private content such as E-mail history, schedule history, memo history, purchase history/transportation system history, and so forth to the private content database 1303.

Also, the server includes, in order to provide a communication prediction service to the client terminals, a contents analysis algorithm computing unit 1304, a movement prediction algorithm computing unit 1305, and a communication prediction algorithm computing unit 1306.

The contents analysis algorithm computing unit 1304 analyzes the contents described in a private content of a client terminal save in the private content database 1303, predicts a destination to which the client terminal will move, using a contents analyzing algorithm, and supplies this destination prediction information to the movement prediction algorithm computing unit 1305.

The movement prediction algorithm computing unit 1305 predicts a movement route to the destination predicted at the contents analysis algorithm computing unit 1304 from the current location of the client terminal determined or estimated based on the sensor information using a movement predicting algorithm, and supplies this movement prediction information to the communication prediction algorithm computing unit 1306.

The movement prediction algorithm computing unit 1305 uses the past movement history of a user employing this client terminal, or another user's movement history as well as the appropriate user to predict how this client terminal moves from now on in the case of the current location and current point-in-time. As for a predicting method, the probability of a movement route at this point-in-time on this day of the week is obtained using the movement history, and a movement route having the highest probability is selected. Alternatively, a learning algorithm employing a hidden Markov model (HMM) is used to predict a movement route out of movement route candidates obtained from the movement history. According to the hidden Markov model, a movement route, i.e., connection between spots is represented with typical probability state transition machine. In the event of performing prior study of typical probability state transition machine based on a user's movement history to be extracted from sensor information to perform a communication prediction service, prediction of a movement route can be obtained by inputting the current location information of the user to this probability state transition machine.

Also, the movement prediction algorithm computing unit 1305 also employs a method for predicting a destination by analyzing a private content such as a schedule, E-mail, or memo pad to determine these schedules as well as a method for predicting a movement route and a destination using a movement history. Thus, it can be predicted how the client terminal will move as to the current location and current point-in-time in the future.

The communication prediction algorithm computing unit 1306 compares the movement prediction information (destination, movement route) predicted by the movement prediction algorithm computing unit 1305 with communication information saved in the communication information database 1301, thereby predicting the future communication information of the client terminal. The communication prediction algorithm computing unit 1306 employs the communication predicting algorithm, thereby predicting an offline predicted location or offline predicted time wherein the client terminal turns into an offline state over the movement route of the client terminal, and an online return predicted location or online return predicted time wherein the client terminal returns to the online state, and informs this communication prediction information to the client terminal.

Communication information saved in the communication information database 1301 is, as described above, the communication history and radio wave strength measurement history of each user, communication history and radio wave strength history collected from multiple users, the layout information or radio wave environment information as to locations, of base stations that a cellular phone carrier company or a company which manages WiFi access points possesses, and so forth. The communication prediction algorithm computing unit 1306 can recognize a WiFi or cellular phone communication area, and radio wave environment information such as communication speed based on these communication information. The communication prediction algorithm computing unit 1306 collates this radio wave environment information with the prediction of a movement route, thereby determining when, which location, what communication carrier turns into offline over the predicted movement route of the client terminal, i.e., determining the offline area for each communication carrier.

The client terminal performs control of the own communication function based on the communication prediction information from the communication prediction algorithm computing unit 1306 of the server. Specifically, upon reaching the offline predicted location or offline predicted time informed as the communication prediction information, the client terminal suspends the communication function such as the cellular phone transmission/reception unit 1006 or wireless LAN communication unit 1007 or the like. Also, in the event of determining that the current location or current point-in-time has reached the online return predicted location or time, the client terminal at the time of offline restores the communication function based on location recognition using GPS, WiFi, or acceleration sensor, or time determined using point-in-time recognizing means such as the internal clock unit 1017 which the client terminal has or the like.

Accordingly, the client terminal can reduce power consumption accompanied with operating the communication function for searching a base station or access point at the time of offline. Also, in the event of including multiple wireless communication functions as well as the cellular phone transmission/reception unit 1006 and wireless LAN communication unit 1007, the client terminal can reduce power consumption by suspending only a wireless communication function of which the offline state continues long.

With the system configuration example illustrated in FIG. 13, the communication information database is integrally managed on the server side. In such a case, the client terminal basically performs determination of the own offline state/online state based on the communication prediction information to be received from the server. Accordingly, the communication prediction service of the client terminal can be realized in accordance with the processing procedure illustrated in FIG. 8.

Also, as a modification of the system configuration, the client terminal side may also hold the map data (or communication information such as the received radio wave strength and so forth of each access point) of base stations and access points by itself. In this case, the client terminal can accurately determine whether the current location is in either an online state or offline state in accordance with the location information obtained at the location recognizing means. The client terminal can control on/off of the communication function in accordance with the processing procedure illustrated with a flowchart format in FIG. 9A and FIG. 9B without notification of the communication prediction information from the server.

Figure 14:
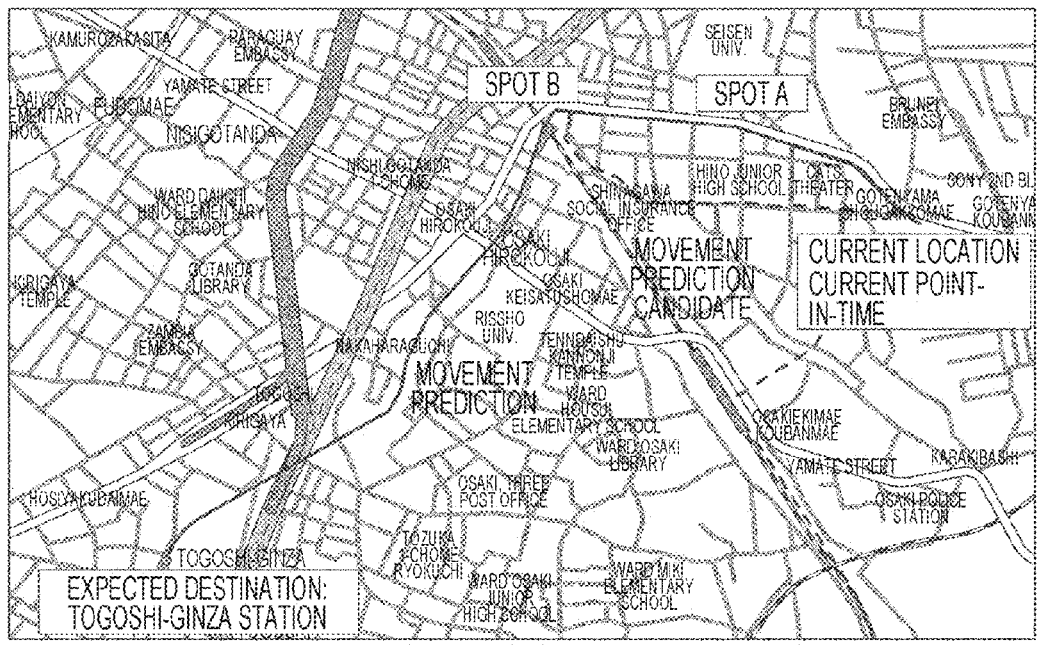
FIG. 14 is a diagram illustrating an example of a prediction result of a movement route of a client terminal according to a movement prediction algorithm computing unit 1305.

FIG. 14 illustrates an example of the prediction result of a movement route of a client terminal according to the movement prediction algorithm computing unit 1305.

In response to the sensor information of a client terminal being uploaded to the server, the movement prediction algorithm computing unit 1305 within the server first recognizes the current location and current point-in-time of the client terminal. The movement prediction algorithm computing unit 1305 then predicts, based on the past movement history of a user who uses this client terminal, or the movement history of another user as well as this user's movement history, how the client terminal moves from now on from the current location and current point-in-time.

The movement prediction algorithm computing unit 1305 uses movement history to obtain the probability of the movement route in the case of this point-in-time and this day of the week, and to select a movement route having the highest probability as the movement predicting algorithm. Alternatively, the movement prediction algorithm computing unit 1305 uses a learning algorithm to which a hidden Markov model has been applied to predict a movement route out of one or more movement route candidates calculated from movement history as the movement predicting algorithm.

Also, at the time of predicting the movement route of a client terminal, the movement prediction algorithm computing unit 1305 uses only movement history to predict the destination of a client terminal and a movement route up to the destination. Alternatively, the movement prediction algorithm computing unit 1305 may analyze a user's private content saved in the private content database 1303, such as a schedule, E-mail, or memo pad, to figure out a schedule of the corresponding user, and to predict a destination.

Figure 15:
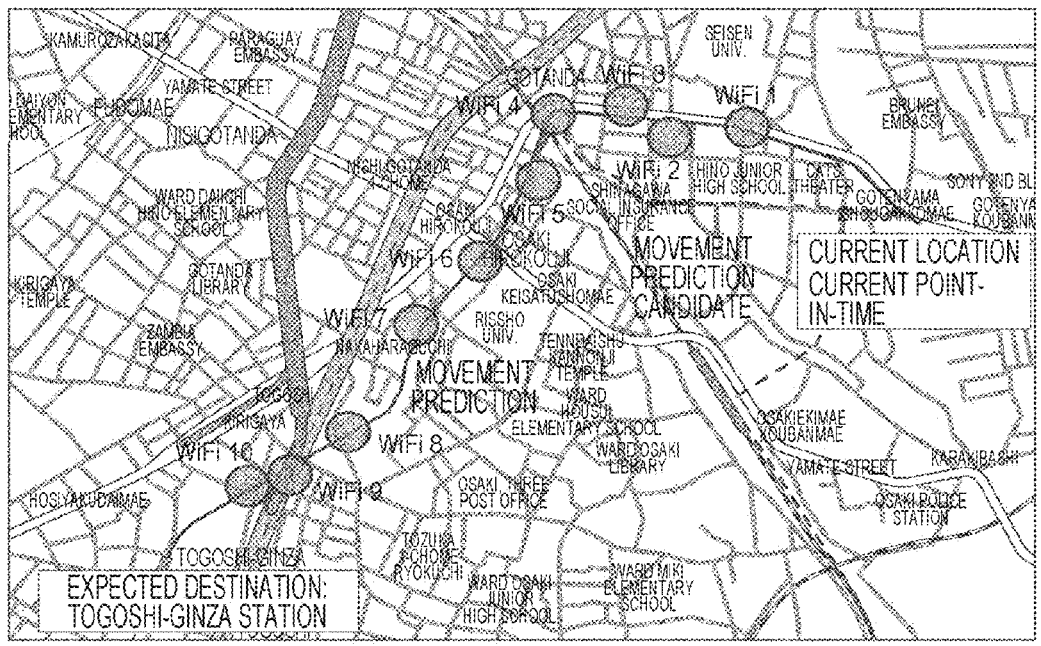
FIG. 15 is a diagram exemplifying an offline area determined over the movement route of the client terminal illustrated in FIG. 14.

FIG. 15 exemplifies an offline area that the communication prediction algorithm computing unit 1306 has determined above the movement route of the client terminal illustrated in FIG. 14. This drawing is the determination result of WiFi offline area as communication carrier, where 10 online areas of WiFi_1, WiFi_2, . . . , WiFi_10 are predicted over the movement route. Consequently, a location that deviates from each online area over the movement route is an offline area. The communication prediction algorithm computing unit 1306 informs communication prediction information including the offline predicted location or offline predicted time, and online return predicted location or time regarding each offline area, for example, when the client terminal comes closer to an offline area.

With the communication system according to the present embodiment, the server predicts the movement route of a client terminal, further predicts an offline area (for each communication carrier) over the predicted movement route, whereby the communication prediction information can be informed to the client terminal. On the other hand, the client terminal can recognize existence of an offline area over the own movement route, i.e., a location or point-in-time whereby the communication function can be suspended, and a location or point-in-time wherein the communication function has to be restored based on the notified communication prediction information. The client terminal can realize higher power saving effects as compared to the power saving mode at the time of common passive scan, or the like, since not even intermittent reception is performed when the communication function is suspended.

INDUSTRIAL APPLICABILITY

Description has been made in detail so far regarding the present invention with reference to a particular embodiment.

However, it is clearly evident that one skilled in the art can modify or substitute this embodiment without departing from the essence of the present invention.

With the present Specification, though description has been made focusing on the embodiment relating to the communication system including WiFi, W-CDMA, LTE, and WiMAX as wireless communication units, the essence of the present invention is not restricted to this. The present invention can similarly be applied to even a case where the wireless communication services provided by various communication carriers are included in the wireless communication unit.

Also, with the present Specification, though description has been made focusing on the embodiment wherein all of the content analyzing algorithm, movement predicting algorithm, communication predicting algorithm, private content database, sensor information database, and communication information database are equipped on the server side, the present invention can similarly be realized even when at least a part of these algorithms and databases are equipped on the client side.

In conclusion, the present invention has been disclosed in a mode as an exemplification, and the described contents of the present Specification does not have to be interpreted in a limited manner. In order to determine the essence of the present invention, the claims should be referred.

REFERENCE SIGNS LIST

1001 CPU
1002 ROM
1003 RAM
1004 storage unit
1005 bus
1006 cellular phone transmission/reception unit
1007 wireless LAN communication unit
1008 operating unit
1009 LED
1010 vibrator
1011 audio input/output control unit
1012 microphone
1013 audio input/output control unit
1014 display
1015 imaging unit
1016 sensor group
1017 internal clock unit
1018 noncontact IC module
1201 CPU
1202 front side bus (FSB)
1203 north bridge
1204 AGP bus
1205 video controller
1206 LCD
1207 VGA
1208 cache memory
1209 RAM
1210 hub interface
1211 south bridge
1211A AC link interface
1211B USB interface
1211C IDE interface
1211D PCI interface
1211E LPCB interface
1211F LAN interface
1212 AC link bus
1213 modem
1214 sound controller
1216 speaker
1217 USB bus
1218 USB connector
1222 IDE bus
1223 HDD
1224 CD-ROM drive
1225 wireless LAN communication unit
1226 PCI bus
1227 IEEE1394 interface
1228 IEEE1394 port
1229 card interface
1230 wired LAN card
1251 LPC bus
1252 ROM
1253 I/O interface
1254 controller
1260 battery
1301 communication information database
1302 sensor information database
1303 private content database
1304 contents analysis algorithm computing unit
1305 movement prediction algorithm computing unit
1306 communication prediction algorithm computing unit
1310 upload controller

The invention claimed is:

1. An information providing apparatus comprising:
a communication unit configured to connect to a client terminal, comprising a transmitter and receiver, to perform communication;
a contents analyzing unit configured to receive private content stored by the client terminal and to estimate the destination of a user in possession of the client terminal based at least in part on the received private content, the received private content comprising an email history of a user of the client terminal, memo history of the user of the client terminal, and/or image information stored on the client terminal;
a movement predicting unit configured to estimate the current location of said client terminal, and also to predict a movement route from said current location to said estimated destination; and
a communication predicting unit configured to:
predict an offline area at which said client terminal will be unable to connect to a base station or access point over said predicted movement route, and to instruct said client terminal to suspend supply of power to the transmitter and receiver for a duration of a set time period which begins when the client terminal is to approach the predicted offline area, and ends when the client terminal is to leave the predicted offline area;
transmit, if predicting that there is an offline area where said client terminal has an inability to connect to any base station or access point over said movement route, communication prediction information comprising the predicted offline area in which said client terminal will be in a connection disabled state, and an area in which said client terminal will assume a connectable condition with a base station or access point; and
release a pause of a connection with said client terminal to attempt connection therewith when another predetermined condition is satisfied, even in the event that said client terminal has not assumed said connectable condition.

2. The information providing apparatus according to claim 1, wherein the private content received by the content analyzing unit is stored by the client terminal in a private content database, and wherein said contents analyzing unit analyzes the private content held in said private content database, and estimates the user's destination based at least in part on an obtained action schedule.

3. The information providing apparatus according to claim 1, wherein said received private content comprises an action history of the user of the client terminal, the action history comprising at least one of a user's login ID, login time and date, login location, logoff time and date, logoff location, transportation system history, purchase history of various products, viewing history of broadcast programs and other contents, and operation history of various types of information equipment.

4. The information providing apparatus according to claim 1, wherein said movement predicting unit estimates said current location based at least in part on sensor information obtained from said client terminal.

5. The information providing apparatus according to claim 4, wherein said sensor information includes at least one of GPS (Global Positioning System) reception radio wave information, received signal strength information of a WiFi base station (RSSI: Receiving Signal Strength Indicator), acceleration information measured by an acceleration sensor, or other sensor information for estimating the location information of said client terminal, measured by said client terminal.

6. The information providing apparatus according to claim 1, wherein said movement predicting unit predicts, at least in part, a movement route from the estimated current location to a destination using a learning algorithm employing a hidden Markov model.

7. The information providing apparatus according to claim 1, further comprising:
a communication information database configured to hold the communication information of a base station or access point at each spot;
wherein said communication predicting unit predicts a connection state between said client terminal and a base station or access point over said movement route based on said communication information database.

8. The information providing apparatus according to claim 7, wherein said communication information includes at least one of the transmission rate or received radio wave strength of a base station or access point at each spot.

9. The information providing apparatus according to claim 1, wherein said communication prediction information includes, as information of said connection disabled state, an offline predicted location or offline predicted time with said client terminal arriving at said offline area, and includes, as information of said connectable condition, an online return predicted location or online return predicted time with said client terminal returning to an online area.

10. A method for providing information to a client terminal comprising a transmitter and receiver, the method comprising:
a content receiving step comprising receiving, from the client terminal, private content stored by the client terminal, the received private content comprising an email history of a user of the client terminal, memo history of the user of the client terminal, and/or image information stored by the client terminal;
a contents analyzing step comprising estimating the destination of a user in possession of the client terminal based at least in part on the received private content;
a movement predicting step comprising estimating the current location of said client terminal, and predicting a movement route from said current location to said destination;
a communication predicting step comprising predicting an offline area at which said client terminal will be unable to connect to a base station or access point over said predicted movement route, and instructing said client terminal to suspend supply of power to the transmitter and receiver for a duration of a set time period which begins when the client terminal is to approach the predicted offline area, and which ends when the client terminal is to leave the predicted offline area;
a communication prediction information transmission step comprising transmitting, to said client terminal, communication prediction information including the predicted offline area in which said client terminal will be in a connection disabled state, and an area in which said client terminal will assume a connectable condition with a base station or access point; and
a connection pause releasing step comprising releasing a pause of a connection with said client terminal to attempt connection therewith when another predetermined condition is satisfied, even in the event that said client terminal has not assumed said connectable condition.

11. At least one non-transitory computer-readable medium having instructions encoded thereon which, when executed by a computer operating as a server in a wireless communication system where a server and a client terminal mutually transfer information and are mutually synchronized by wireless communication, cause said computer to perform a method comprising acts of:
connecting to a client terminal, comprising a transmitter and receiver, to perform communication;
receiving, from the client terminal, private content stored by the client terminal, the received private content comprising an email history of a user of the client terminal, memo history of the user of the client terminal, and/or image information stored on the client terminal;
estimating the destination of a user in possession of the client terminal based at least in part on the received private content;
estimating the current location of said client terminal, and predicting a movement route from said current location to said destination;
predicting an offline area at which said client terminal will be unable to connect to a base station or access point over said predicted movement route;
instructing said client terminal to suspend supply of power to the transmitter and receiver for a duration of a set time period which begins when the client terminal is to approach the predicted offline area and which ends when the client terminal is to leave the predicted offline area;
transmitting, to said client terminal, communication prediction information including the predicted offline area in which said client terminal will be in a connection disabled state, and an area in which said client terminal will assume a connectable condition with a base station or access point; and
releasing a pause of a connection with said client terminal to attempt connection therewith when another predetermined condition is satisfied, even in the event that said client terminal has not assumed said connectable condition.

12. A wireless communication apparatus comprising:
a communication unit configured to perform wireless communication with a base station or access point; and
at least one processor programmed to control a connection operation with a server via the base station or access point, and the operation of said communication unit;

wherein:
said communication unit is configured to transmit, to the server, private content which is stored by the wireless communication apparatus, the private information comprising an email history of a user of the wireless communication apparatus, memo history of the user of the wireless communication apparatus, and/or image information stored by the wireless communication apparatus;

said communication unit is configured to receive instructions sent by the server in response to the private content being transmitted, said instructions being for the wireless communication apparatus to suspend power supply to the communication unit for a duration of a set time period which begins when the wireless communication apparatus is to approach a predicted offline area and ends when the wireless communication apparatus is to leave the predicted offline area, the predicted offline area being an area over a predicted movement route of the wireless communication apparatus at which the wireless communication apparatus will be unable to connect to the base station or access point;

said communication unit is configured to receive communication prediction information comprising the predicted offline area in which said wireless communication apparatus will be in a connection disabled state, and an area in which said wireless communication apparatus will assume a connectable condition with the base station or access point; and said at least one processor is programmed to control the connection operation with said server based on the instructions received from the server, said control comprising releasing a pause of a connection with said server to attempt connection therewith when another predetermined condition is satisfied, even in the event that said wireless communication apparatus has not assumed said connectable condition.

13. A wireless communication method comprising:
estimating a destination of a user in possession of a client terminal, comprising a transmitter and receiver, based at least in part on private information stored by the client terminal, the private information comprising an email history of a user of the client terminal, memo history of the user of the client terminal, and/or image information stored by the client terminal;

predicting an offline area over a movement route between a current location of the client terminal and the estimated destination of the client terminal at which the client terminal will be unable to connect to a base station or access point;

instructing said client terminal to suspend supply of power to the transmitter and receiver for a duration of a set time period which begins when the client terminal is to approach the predicted offline area and ends when the client terminal is to leave the predicted offline area;

transmitting, to the client terminal, communication prediction information including the predicted offline area in which the client terminal will be in a connection disabled state, and an area in which said client terminal will assume a connectable condition with a base station or access point; and releasing a pause of a connection with the client terminal to attempt connection therewith when another predetermined condition is satisfied, even in the event that the client terminal has not assumed the connectable condition.

14. At least one non-transitory computer-readable medium having instructions encoded thereon which, when executed by a computer for operating as a client terminal in a wireless communication system where a server and a client terminal mutually transfer information and are mutually synchronized by wireless communication, cause said computer to perform a method comprising acts of:
performing, using a communication unit, wireless communication with a base station or access point; and
controlling, using a control unit, a connection operation with a server via the base station or access point, and the operation of said communication unit;
wherein the act of controlling comprises:
transmitting, to the server, private content which is stored by the computer, the private content comprising an email history of a user of the computer, memo history of a user of the computer, and/or image information stored by the computer; and
receiving instructions sent by the server in response to the private content being transmitted, said instructions being for the control unit to suspend power supply to the communication unit for a duration of a set time period which begins when the computer is to approach a predicted offline area and ends when the computer is to leave the predicted offline area, the predicted offline area being an area over a predicted movement route of the computer at which the computer is predicted to be unable to connect to the base station or access point;
receiving communication prediction information sent by the server comprising the predicted offline area in which the client terminal will be in a connection disabled state, and an area in which the client terminal will assume a connectable condition with the base station or access point; and
controlling the connection operation based on the instructions sent by the server, said control comprising releasing a pause of a connection with the server to attempt connection therewith when another predetermined condition is satisfied, even in the event that the client terminal has not assumed the connectable condition.

15. A wireless communication system comprising:
a client terminal, comprising a transmitter and receiver, configured to store private content comprising an email history of a user of the client terminal, memo history of the user of the client terminal, and/or image information stored by the client terminal; and
a server configured to:
receive the private content from the client terminal;
estimate, based at least in part on the private content, a destination of a user in possession of the client terminal;
predict a movement route from a current location of said client terminal to said destination;
predict an offline area at which said client terminal will be unable to connect to a base station or access point over said predicted movement route;
instruct said client terminal to suspend power supply to the transmitter and receiver for a duration of a set time period which begins when the client terminal is to approach the predicted offline area and ends when the client terminal is to leave the predicted offline area;
transmit, to said client terminal, communication prediction information including the predicted offline area in which said client terminal will be in a connection disabled state, and an area in which said client terminal will assume a connectable condition with a base station or access point; and release a pause of a connection with said client terminal to attempt connection therewith when another predetermined condition is satisfied, even in the event that said client terminal has not assumed the connectable condition;

wherein said client terminal is configured to control a connection operation with said server based at least in part on said instructions and said communication prediction information; and wherein transfer of information and synchronous processing are performed between said server and said client terminal.

16. The information providing apparatus of claim 1, wherein the communication predicting unit is configured to instruct the client terminal to suspend supply of power to the transmitter and receiver without performing intermittent reception as part of a passive scan.

* * * * *